(12) United States Patent
Shinagawa et al.

(10) Patent No.: US 7,099,511 B2
(45) Date of Patent: Aug. 29, 2006

(54) METHOD AND APPARATUS FOR CODING AND DECODING IMAGE DATA USING CRITICAL POINTS

(75) Inventors: Yoshihisa Shinagawa, Tokyo (JP); Hiroki Nagashima, Chiba (JP)

(73) Assignee: Monolith Co., Ltd., Tokyo (JP)

( * ) Notice: Subject to any disclaimer, the term of this patent is extended or adjusted under 35 U.S.C. 154(b) by 941 days.

(21) Appl. No.: 09/781,309

(22) Filed: Feb. 13, 2001

(65) Prior Publication Data

US 2002/0003904 A1 Jan. 10, 2002

(30) Foreign Application Priority Data

Mar. 14, 2000 (JP) ........................................ 2000-069842

(51) Int. Cl.
*G06K 9/30* (2006.01)

(52) U.S. Cl. ........................ 382/236; 382/232; 382/238
(58) Field of Classification Search ................. 382/232, 382/236, 238, 233, 239; 375/240.05, 240.01; 345/473
See application file for complete search history.

(56) References Cited

U.S. PATENT DOCUMENTS

| 5,546,194 | A | * | 8/1996 | Ross ........................... 358/445 |
| 5,812,699 | A | * | 9/1998 | Zhu et al. .................... 382/232 |
| 5,959,690 | A | * | 9/1999 | Toebes et al. ............... 348/578 |
| 5,966,141 | A | * | 10/1999 | Ito et al. ...................... 345/473 |
| 6,018,592 | A | | 1/2000 | Shinagawa et al. ......... 382/195 |
| 6,137,910 | A | | 10/2000 | Shinagawa et al. ......... 382/195 |
| 6,212,232 | B1 | * | 4/2001 | Reed et al. ............. 375/240.03 |

FOREIGN PATENT DOCUMENTS

| GB | 2 263 602 | 7/1993 |
| JP | 53-082219 | 7/1978 |
| JP | 59-123383 | 7/1984 |
| JP | 401297770 | * 11/1989 |
| JP | 03-133297 | 6/1991 |
| JP | 10032827 | * 2/1998 |
| JP | 2927350 | 10/1998 |

OTHER PUBLICATIONS

Shinagawa et al., "Unconstrained Automatic Image Matching Using Multiresolutional Critical–Point Filters", IEEE Transactions o Pattern Analysis and Machine Intelligence, vol. 20, No. 9, Sep. 1998, pp. 994–1010.*

European Patent Office, European Search Report, Mar. 17, 2004, 4 pages.

Garcia, N., et al., "Pixel–Based Video Compression Schemes", Video Coding: The Second Generation Approach, 1996, pp. 31–78.

Haskell, B.G. et al., "MPEG–2 Video Coding and Compression", Digital Video: an Introduction to MPEG2, 1996, pp. 162–175.

Puri, A. et al. "Video Coding with Motion–Compensated Interpolation for CD–ROM Applications", Signal Processing Image Communication, vol. 2, No. 2, Aug. 1990, pp. 127–144.

(Continued)

*Primary Examiner*—Anh Hong Do

(57) ABSTRACT

An image data coding and decoding technique which realizes most efficient compression of the image data. The image data are input and separated into key frames and other intermediate frames. Per-pixel matching is computed between the key frames. A virtual intermediate frame between these key frames is generated by interpolating the matching-computed result. Difference is taken between the intermediate virtual frames and actual intermediate frames which have existed from the outset, so that the actual intermediate frames are encoded with the minimum quantity of codes.

26 Claims, 20 Drawing Sheets

OTHER PUBLICATIONS

Nieweglowski, J. et al., "A Novel Video Coding Scheme Based on Temporal Prediction Using Digital Image Warping", IEEE Transactions on Consumer Electronics, vol. 39, No. 3, Aug. 1993, pp. 141–150.
Japan Patent Office, Patent Abstracts of Japan, Publication No. 03–133297, Jun. 6, 1991, 2 pages.
Japan Patent Office, Patent Abstracts of Japan, Publication No. 59–123383, Jul. 17, 1984, 2 pages.
Japan Patent Office, Patent Abstracts of Japan, Publication No. 53–082219, Jul. 20, 1978, 1 page.
Japan Patent Office, Patent Abstracts of Japan, Patent No. 29273 50, Publication No. 10–269355, Oct. 9, 1998 2 pages.

* cited by examiner p(m, s)

p(m-1, 0)

p(m-1, 1)

p(m-1, 2)

p(m-1, 3)

METHOD AND APPARATUS FOR CODING AND DECODING IMAGE DATA USING CRITICAL POINTS

BACKGROUND OF THE INVENTION

1. Field of the Invention

The present invention relates to an image data processing technique, and it particularly relates to method and apparatus for coding or decoding image data included in a plurality of frames.

2. Description of the Related Art

As the performance of medical image equipment such as MRI and CT system advances and improves significantly in recent years, more and more cross sectional images can be photographed under the same level of X-ray exposure dosage to a patient. For example, many cross sectional medical images of a diseased part can be acquired for as many as 300–1000 images at a time as a result of the recent improvement, compared to 20 images as the maximum in the past On the other hand, even though such a great number of images can be acquired, those images need be stored for a predetermined period of time as bound by the law, thus causing a trouble in medical institutions because of extremely huge amount of image data to be stored. Moreover, when the medical images need be transmitted within a hospital or between different hospitals, the large number of images results in the unwanted increase of communication time and may threaten the smooth operation of the medical institutions.

In order to cope with the situation, recently the Ministry of Health and Welfare in Japan comes to approve of the storage of the medical images in the form of digital data because digitization makes possible application of the various data compression techniques. However, the current compression technique does not catch up with the increase of highly microscopic image data acquired not only in the medical field but also in the image processing field in general. Therefore, the search for a further efficient compression technique is an everlasting theme in the field, and such technology is highly desired in our advanced society.

SUMMARY OF THE INVENTION

The present invention has been made in view of the foregoing circumstances and an object thereof is to provide a coding and decoding technique to realize an efficient compression of the image data.

Another object of the present invention is to provide an image processing technique capable of maintaining the image quality at the time of coding.

Still another object of the present invention is to provide an image coding and decoding technique overcoming two conflicting factors, that is, the technique suitable for maintaining the image quality and improving the compression rate at the same time.

According to an aspect of the present invention, a method of coding image data, comprises: separating frames included in image data into a key frame and an intermediate frame; computing a matching between the key frames thus separated; generating a virtual intermediate frame based on the matching; and encoding an actual intermediate frame included in the image data based on the virtual intermediate frame.

Term "separating" means both classifying those initially unclassified into the key frames and the intermediate frames in a constructive sense and also classifying those initially classified in accordance with its indication in a negative sense.

Term "key frame" indicates a reference frame to be matching-computed while term "intermediate frame" a non-reference frame to which the matching will not be computed. In this patent application, for the purpose of simplicity the term "frame" is both used as a unit of the image unless otherwise indicated, and as data itself constituting the unit, that are, "frame data".

Term "virtual intermediate frame" indicates a frame derived from the matching computation, and differs from that initially classified as "intermediate frame" in the image data (that is, the "actual intermediate frame").

The image data processed in the present invention may be of moving pictures or of still pictures such as a medical image in which a 3D object is made to a 2D image. Moreover, all types of images of arbitrary dimension which can be grasped as a frame can be processed in the present invention.

In a preferred embodiment, the actual intermediate frame is encoded based on the virtual intermediate frame. As a general rule, when the virtual intermediate frame can be generated under conditions where the difference between the virtual intermediate frame and the actual intermediate frame is small, a quantity of codes in the actual intermediate frame will be made small by compression-coding the difference. Since the virtual intermediate frame itself is obtained from the matching computation, a quantity of the inherent codes is small and can be made to zero.

The above computing process may include computing the matching, in a per-pixel manner, between the key frames, and the generating process may include performing an interpolation computation per pixel based on correspondence of a pixel position and intensity between the key frames so as to generate the virtual intermediate frame. The "interpolation" may be replaced with or combined by extrapolation, and it may be of a linear or non-linear type.

The method of coding the image data according to the present invention may further include outputting, storing or transmitting, as encoded data for the image data, a combination of key frame data and data obtained in the encoding process. Thus, the "coding" or "encoding" described in this patent application relates to the intermediate frame and the whole image data. In general, the latter is produced as a result of the former.

According to another aspect of the present invention an image data coding apparatus, comprises: a unit which acquires image data including a plurality of frames; a unit which separates the frames included in the image data into a key frame and an intermediate frame; a unit which inputs the key frames thus separated and computes a matching between the inputted key frames; a unit which generates a virtual intermediate frame based on the matching computed; and a unit which encodes an actual intermediate frame thus separated, based on the virtual intermediate frame. Each above unit can be realized as arbitrary combination of software and hardware.

The generating unit may generate the virtual intermediate frames by interpolating between the pixels of the key frames based on a result of the per-pixel matching.

Moreover, the generating unit may perform an interpolation calculation on each pixel based on correspondence of position and intensity of pixels between the key frames, so as to generate the virtual intermediate frame.

According to still another aspect of the present invention, a method of decoding image data, comprises: separating key frames of the image data included in encoded data of the image data, from other supplementary data; generating a virtual intermediate frame based on computing a matching between the key frames thus separated; and decoding an actual intermediate frame based on the virtual intermediate frame and the supplementary data. The "decoding" described in this patent application relates to the intermediate frame and the whole image data. In general, the latter is produced as a result of the former.

The supplementary data may be data produced based on the difference between the actual intermediate frame and the virtual intermediate frame, for example, data obtained by performing a spatial-frequency-related coding process such as entropy coding and JPEG. In that case, the actual intermediate frame may be decoded by adding decoded data of data generated based on the virtual intermediate data and the difference.

Moreover, the image data decoding method may further comprise outputting, storing and transmitting, as decoded data of the image data, a combination of data of the key frame and data of the actual intermediate frame.

According to still another aspect of the present invention, an image data decoding apparatus, comprises: a unit which acquires encoded data of image data; a unit which separates key frames of the image data included in the encoded data, from other supplementary data; a unit which computes a matching between the key frames separated in said separating unit; a unit which generates a virtual intermediate frame based on the matching computed in the computing unit; and a unit which decodes an actual intermediate frame based on the virtual intermediate frame and the other supplementary data.

In another preferred embodiment according to the image data coding method of the present invention, a method of coding image data, comprises: separating frames included in image data into a key frame and an intermediate frame; generating a series of source hierarchical images of different resolutions by operating a multiresolutional critical point filter on a first key frame obtained by the separating process; generating a series of destination hierarchical images of different resolutions by operating the multiresolutional critical point filter on a second key frame obtained by the separating process; computing a matching of the source hierarchical images and the destination hierarchical images among a resolutional level hierarchy; generating a virtual intermediate frame based on the matching computed; and encoding an actual intermediate frame included in the image data, based on the virtual intermediate frame.

In a preferred embodiment according to the image data coding apparatus of the present invention, an image data coding apparatus, comprises: a unit which acquires image data including a plurality of frames; a unit which separates the frames included in the image data into a key frame and an intermediate frame; a unit which inputs the key frames thus separated and computes a matching between the inputted key frames; a unit which generates a virtual intermediate frame based on the matching computed; and a unit which encodes an actual intermediate frame thus separated, based on the virtual intermediate frame.

Preferably, the matching computing unit according to the above structure generates a series of source hierarchical images of different resolutions by operating a multiresolutional critical point filter on a first key frame obtained by the separating unit, generates a series of destination hierarchical images of different resolutions by operating the multiresolutional critical point filter on a second key frame obtained by the separating unit, and computes a matching of the source hierarchical images and the destination hierarchical images among a resolutional level hierarchy.

In still another embodiment of the image data coding method according to the present invention, an image data coding method includes: acquiring a virtual intermediate frame generated based on a result of a process performed between key frames included in the image data; and encoding an actual intermediate frame included in the image data, based on the virtual intermediate frame. Namely, the matching process or a process of generating the virtual intermediate frames or the like is regarded as a preprocessing in the present invention.

In still another embodiment of the image data coding apparatus according to the present invention, an image data coding apparatus includes: a first functional block which acquires a virtual intermediate frame generated based on a result of a process performed between key frames included in image data; and a second functional block which encodes an actual intermediate frame included in the image data, based on the virtual intermediate frame.

In still another embodiment of the image data decoding method according to the present invention, an image data decoding method includes the steps of: acquiring a virtual intermediate frame generated based on a result of a process performed between key frames obtained by separating the key frames from supplementary data included in encoded data of the image data; and decoding an actual intermediate frame based on the virtual intermediate frame and the supplementary data. It is intended that a process starts from the input of the virtual intermediate frames and the key frames.

In still another embodiment of the image data decoding apparatus according to the present invention, an image data decoding apparatus includes: a first functional block which acquires a virtual intermediate frame generated based on a result of a process performed between key frames obtained by separating the key frames from supplementary data included in encoded data of image data; and a second functional block which decodes an actual intermediate frame based on the virtual intermediate frame and the supplementary data.

Moreover, this summary of the invention does not necessarily describe all necessarily features so that the invention may also be sub-combination of these described features.

DETAILED DESCRIPTION OF THE INVENTION

Figures 1A, 1B:
FIG. 1a is an image obtained as a result of the application of an averaging filter to a human facial image.
FIG. 1b is an image obtained as a result of the application of an averaging filter to another human facial image.

The invention will now be described based on the preferred embodiments, which do not intend to limit the scope of the present invention, but exemplify the invention. All of the features and the combinations thereof described in the embodiment are not necessarily essential to the invention.

Before describing the preferred embodiments according to the present invention, preferred embodiments according to the base technology on which the present embodiments are based will be described so as to clarify the present invention. The base technology has been patented as U.S. Pat. No. 6,018,592 and U.S. Pat. No. 6,137,910 assigned to the same assignee.

The following sections of [1] and belong to the preferred embodiments according to the base technology, where [1] describes elemental techniques applied in the preferred embodiments, and [2] describes a processing procedure.
Preferred Embodiments According to Base Technology
[1] Detailed description of elemental techniques
[1. 1] Introduction Using a set of new multiresolutional filters called critical point filters, image matching is accurately computed. There is no need for any prior knowledge concerning objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, smooth generation of motion images from a small number of frames. When applied to the morphing, given images can be automatically transformed. When applied to the volume rendering, intermediate images between cross sections can be accurately reconstructed, even when the distance between them is rather long and the cross sections vary widely in shape.
[1. 2] The hierarchy of the critical point filters The multiresolutional filters according to the base technology can preserve the intensity and locations of each critical point included in the images while reducing the resolution. Now, let the width of the image be N and the height of the image be M. For simplicity, assume that N=M=2n where n is a positive integer. An interval [0, N]⊂R is denoted by I. A pixel of the image at position (i, j) is denoted by $p^{(i,j)}$ where i,j∈I.

Here, a multiresolutional hierarchy is introduced. Hierarchized image groups are produced by a multiresolutional filter. The multiresolutional filter carries out a two dimensional search on an original image and detects critical points therefrom. The multiresolutinal filter then extracts the critical points from the original image to construct another image having a lower resolution. Here, the size of each of the respective images of the m-th level is denoted as $2^m \times 2^m$ (0 m n). A critical point filter constructs the following four new hierarchical images recursively, in the direction descending from n.

$$p_{(i,j)}^{(m,0)} = \min(\min(p_{2i,2j}^{(m+1,0)}, p_{2i,2j+1}^{(m+1,0)}), \min(p_{2i+1,2j}^{(m+1,0)}, p_{2i+1,2j+1}^{(m+1,0)}))$$

$$p_{(i,j)}^{(m,1)} = \min(\min(p_{2i,2j}^{(m+1,1)}, p_{2i,2j+1}^{(m+1,1)}), \min(p_{2i+1,2j}^{(m+1,1)}, p_{2i+1,2j+1}^{(m+1,1)}))$$

$$p_{(i,j)}^{(m,2)} = \min(\min(p_{2i,2j}^{(m+1,2)}, p_{2i,2j+1}^{(m+1,2)}), \min(p_{2i+1,2j}^{(m+1,2)}, p_{2i+1,2j+1}^{(m+1,2)}))$$

$$p_{(i,j)}^{(m,3)} = \min(\min(p_{2i,2j}^{(m+1,3)}, p_{2i,2j+1}^{(m+1,3)}), \min(p_{2i+1,2j}^{(m+1,3)}, p_{2i+1,2j+1}^{(m+1,3)})) \quad (1)$$

where let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x \leq t \leq x+1}$ are abbreviated to and $\alpha$ and $\beta$, respectively, the subimages can be expressed as follows.

$$P^{(m,0)} = \alpha(x)\alpha(y)p^{(m+1,0)}$$

$$P^{(m,1)} = \beta(x)\alpha(y)p^{(m+1,1)}$$

$$P^{(m,2)} = \alpha(x)\beta(y)p^{(m+1,2)}$$

Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this base technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here). Thus, resolution of the image is reduced. From a singularity theoretical point of view, $\alpha(x)\alpha(y)$ preserves the local minimum point (minima point), $\beta(x)\beta(y)$ preserves the local maximum point (maxima point), $\alpha(x)\beta(y)$ and $\beta(x)\alpha(y)$ preserve the saddle point.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of the resolution levels. First, the minima points are matched using $p^{(m,0)}$. Next, the saddle points are matched using $p^{(m,1)}$ based on the previous matching result for the minima points. Other saddle points are matched using $p^{(m,2)}$. Finally, the maxima points are matched using $p^{(m,3)}$.

Figures 1C, 1D:
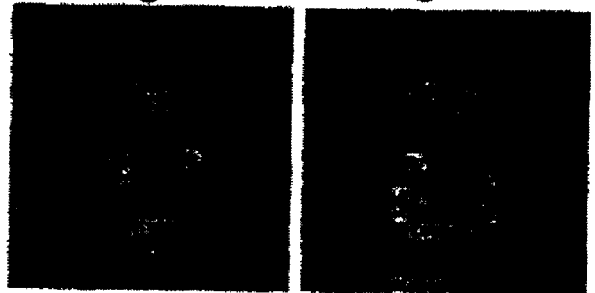
FIG. 1c is an image of a human face at $p^{(5,0)}$ obtained in a preferred embodiment in the base technology.
FIG. 1d is another image of a human face at $p^{(5,0)}$ obtained in a preferred embodiment in the base technology.
Figures 1E, 1F:
FIG. 1e is an image of a human face at $p^{(5,1)}$ obtained in a preferred embodiment in the base technology.
FIG. 1f is another image of a human face at $p^{(5,1)}$ obtained in a preferred embodiment in the base technology.
Figures 1G, 1H:
FIG. 1g is an image of a human face at $p^{(5,2)}$ obtained in a preferred embodiment in the base technology.
FIG. 1h is another image of a human face at $p^{(5,2)}$ obtained in a preferred embodiment in the base technology.
Figures 1I, 1J:
FIG. 1i is an image of a human face at $p^{(5,3)}$ obtained in a preferred embodiment in the base technology.
FIG. 1j is another image of a human face at p$^{(5,3)}$ obtained in a preferred embodiment in the base technology.

FIGS. 1c and 1d show the subimages $p^{(5,0)}$ of the images in FIGS. 1a and 1b, respectively. Similarly, FIGS. 1e and 1f show the subimages $p^{(5,1)}$. FIGS. 1g and 1h show the subimages $p^{(5,2)}$. FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on the both sides of the necks become clear by $p^{(5,2)}$. The ears and bright parts of cheeks become clear by $p^{(5,3)}$ since these are the maxima points of pixel intensity.

As described above, the characteristics of an image can be extracted by the critical point filter. Thus, by comparing, for example, the characteristics of an image shot by a camera and with the characteristics of several objects recorded in advance, an object shot by the camera can be identified.

[1. 3] Computation of mapping between images

The pixel of the source image at the location (i,j) is denoted by $p_{(i,j)}^{(n)}$ and that of the destination image at (k,l) is denoted by $q_{(k,l)}^{(n)}$ where i, j, k, l∈I. The energy of the mapping between the images (described later) is then defined. This energy is determined by the difference in the intensity of the pixel of the source image and its corresponding pixel of the destination image and the smoothness of the mapping. First, the mapping $f^{(m,0)}:p^{(m,0)} \to q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0,1,2, . . . ) is referred to as a submapping. The order of i will be rearranged as shown in the following (3) in computing $f^{(m,i)}$ for the reasons to be described later.

$$f^{(m,i)}:p^{(m,\sigma(i))} \to q(m,\sigma(i)) \quad (3)$$

where $\sigma(i) \in \{0,1,2,3\}$.

[1. 3. 1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual conceptual supremacy existing between these images. It is to be to be noted that the mappings to be constructed here are the digital version of the bijection. In the base technology, a pixel is specified by a grid point.

The mapping of the source subimage (a subimage of a source image) to the destination subimage (a subimage of a destination image) is represented by $f^{(m,s)}: I/2^{n-m} \times I/2^{n-m} \to I/2^{n-m} \times I/2^{n-m}$ (s=0,1, . . . ), where $f_{(i,j)}^{(m,s)}=(k,l)$ means that $p_{(k,l)}^{(m,s)}$ of the source image is mapped to $q_{(k,l)}^{(m,s)}$ of the destination image. For simplicity, when f(i,j)=(k,l) holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i,i',j,j',k and l are all integers. First, each square region (4)

$$p_{(i,j)}^{(m,s)}p_{(i+1,j)}^{(m,s)}p_{(i+1,j+1)}^{(m,s)}p_{(i,j+1)}^{(m,s)} \quad (4)$$

on the source image plane denoted by R is considered, where i=0, . . . , $2^m-1$, and j=0, . . . , $2^m-1$. The edges of R are directed as follows.

$$\overrightarrow{p_{(i,j)}^{(m,s)}p_{(i+1,j)}^{(m,s)}}, \overrightarrow{p_{(i+1,j)}^{(m,s)}p_{(i+1,j+1)}^{(m,s)}}, \overrightarrow{p_{(i+1,j+1)}^{(m,s)}p_{(i,j+1)}^{(m,s)}} \text{ and } \quad (5)$$

$$\overrightarrow{p_{(i,j+1)}^{(m,s)}p_{(i,j)}^{(m,s)}}$$

This square will be mapped by f to a quadrilateral on the destination image plane. The quadrilateral (6)

$$q_{(i,j)}^{(m,s)}q_{(i+1,j)}^{(m,s)}q_{(i+1,j+1)}^{(m,s)}q_{(i,j+1)}^{(m,s)} \quad (6)$$

denoted by $f^{(m,s)}$ (R) should satisfy the following bijectivity conditions (BC).

$$(So, f^{(m,s)}(R)=f^{(m,s)}(p_{(i,j)}^{(m,s)}p_{(i+1,j)}^{(m,s)}p_{(i+1,j+1)}^{(m,s)}p_{(i,j+1)}^{(m,s)}= q_{(i,j)}^{(m,s)}q_{(i+1,j)}^{(m,s)}q_{(i+1,j+1)}^{(m,s)}q_{(i,j+1)}^{(m,s)})$$

1. The edges of the quadrilateral $f^{(m,s)}$ (R) should not intersect one another.
2. The orientation of the edges of $f^{(m,s)}$ (R) should be the same as that of R (clockwise in the case of FIG. 2).
3. As a relaxed condition, retraction mapping is allowed.

The bijectivity conditions stated above shall be simply referred to as BC hereinafter.

Figure 2R:
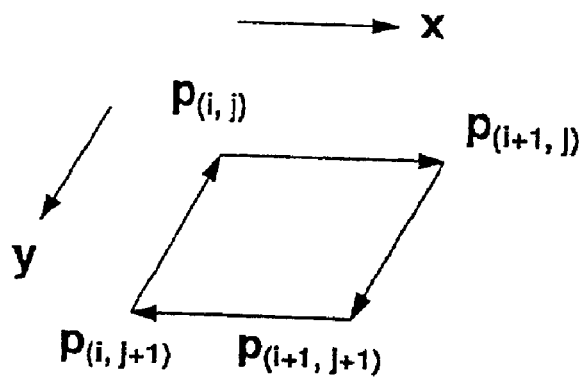
FIG. 2R shows an original quadrilateral.
Figure 2A:
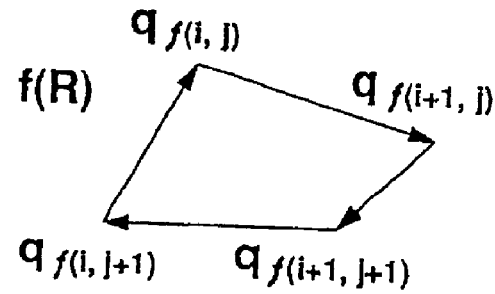
FIG. 2A shows an inherited quadrilateral.
Figure 2E:
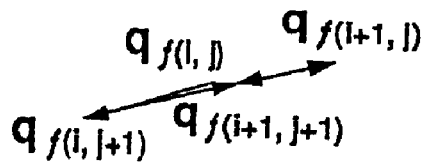
FIG. 2E shows an inherited quadrilateral.
Figure 2B:
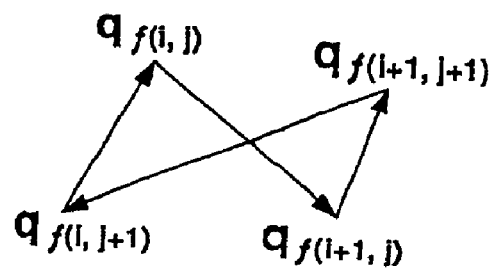
FIG. 2B shows an inherited quadrilateral.
Figure 2D:
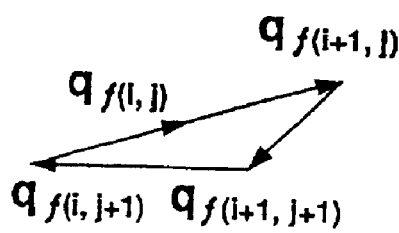
FIG. 2D shows an inherited quadrilateral.
Figure 2C:
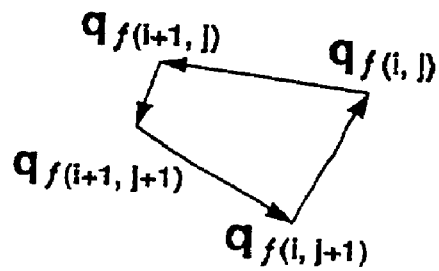
FIG. 2C shows an inherited quadrilateral.

Without a certain type of a relaxed condition, there would be no mappings which completely satisfy the BC other than a trivial identity mapping. Here, the length of a single edge of $f^{(m,s)}$ (R) may be zero. Namely, $f^{(m,s)}$ (R) may be a triangle. However, it is not allowed to be a point or a line segment having area zero. Specifically speaking, if FIG. 2R is the original quadrilateral, FIGS. 2A and 2D satisfy BC while FIGS. 2B, 2C and 2E do not satisfy BC.

In actual implementation, the following condition may be further imposed to easily guarantee that the mapping is surjective. Namely, each pixel on the boundary of the source image is mapped to the pixel that occupies the same locations at the destination image. In other words, $f(i,j)=(i,j)$ (on the four lines of $i=0$, $i=2^m-1$, $j=0$, $j=2^m-1$). This condition will be hereinafter referred to as an additional condition.

[1. 3. 2] Energy of mapping
[1. 3. 2. 1] Cost related to the pixel intensity

The energy of the mapping f is defined. An objective here is to search a mapping whose energy becomes minimum. The energy is determined mainly by the difference in the intensity of between the pixel of the source image and its corresponding pixel of the destination image. Namely, the energy $C_{(i,j)}^{(m,s)}$ of the mapping $f^{(m,s)}$ at $(i,j)$ is determined by the following equation (7).

$$C_{(i,j)}^{(m,s)} = |V(p_{(i,j)}^{(m,s)}) - V(q_{f(i,j)}^{(m,s)})|^2 \quad (7)$$

where $V(p_{(i,j)}^{(m,s)})$ and $V(q_{f(i,j)}^{(m,s)})$ are the intensity values of the pixels $p_{(i,j)}^{(m,s)}$ and $q_{f(i,j)}^{(m,s)}$, respectively. The total energy $C^{(m,s)}$ of f is a matching evaluation equation, and can be defied as the sum of $C_{(i,j)}^{(m,s)}$ as shown in the following equation (8).

$$C_f^{(m,s)} = \sum_{i=0}^{i=2^m-1} \sum_{j=0}^{j=2^m-1} C_{(i,j)}^{(m,s)} \quad (8)$$

[1. 3. 2. 2] Cost related to the locations of the pixel for smooth mapping

In order to obtain smooth mappings, another energy $D_f$ for the mapping is introduced. The energy $D_f$ is determined by the locations of $p_{(i,j)}^{(m,s)}$ and $q_{f(i,j)}^{(m,s)}$ ($i=0,1,\ldots,2^m-1$, $j=0,1,\ldots,2^m-1$), regardless of the intensity of the pixels. The energy $D_{(i,j)}^{(m,s)}$ of the mapping $f^{(m,s)}$ at a point $(i,j)$ is determined by the following equation (9).

$$D_{(i,j)}^{(m,s)} \eta E_{0(i,j)}^{(m,s)} + E_{1(i,j)}^{(m,s)} \quad (9)$$

where the coefficient parameter $\eta$ which is equal to or greater than 0 is a real number. And we have $$E_{0(i,j)}^{(m,s)} = \|(i,j) - f^{(m,s)}(i,j)\|^2 \quad (10)$$

$$E_{1(i,j)}^{(m,s)} = \sum_{i'=i-1}^{i} \sum_{j'=j-1}^{j} \|(f^{(m,s)}(i,j) - (i,j)) - (f^{(m,s)}(i',j') - (i',j'))\| \quad (11)$$

where $\|(x,y)\| = \sqrt{x^2+y^2}$ - - - (12) and $f(i',j')$ is defined to be zero for $i'<0$ and $j'<0$. $E_0$ is determined by the distance between $(i,j)$ and $f(i,j)$. $E_0$ prevents a pixel from being mapped to a pixel too far away from it. However, $E_0$ will be replaced later by another energy function. $E_1$ ensures the smoothness of the mapping. $E_1$ represents a distance between the displacement of $p(i,j)$ and the displacement of its neighboring points. Based on the above consideration, another evaluation equation for evaluating the matching, or the energy $D_f$ is determined by the following equation (13).

$$D_f^{(m,s)} = \sum_{i=0}^{i=2^m-1} \sum_{j=0}^{j=2^m-1} D_{(i,j)}^{(m,s)} \quad (13)$$

[1. 3. 2. 3] Total energy of the mapping

The total energy of the mapping, that is, a combined evaluation equation which relates to the combination of a plurality of evaluation, is defined as $\lambda C_{(i,j)}^{(m,s)} + D_f^{(m,s)}$, where $\lambda \geq 0$ is a real number. The goal is to detect a state in which the combined evaluation equation has an extreme value, namely, to find a mapping which gives the minimum energy expressed by the following (14).

$$\min_f \{\lambda C_f^{(m,s)} + D_f^{(m,s)}\} \quad (14)$$

Care must be exercised in that the mapping becomes an identity mapping if $\lambda=0$ and $\eta=0$ (i.e., $f^{(m,s)}(i,j)=(i,j)$ for all $i=0,1,\ldots,2^m-1$ and $j=0,1,\ldots,2^m-1$). As will be described later, the mapping can be gradually modified or transformed from an identity mapping since the case of $\lambda=0$ and $\eta=0$ is evaluated at the outset in the base technology. If the combined evaluation equation is defined as $C_f^{(m,s)} + \lambda D_f^{(m,s)}$ where the original position of $\lambda$ is changed as such, the equation with $\lambda=0$ and $\eta=0$ will be $C_f^{(m,s)}$ only. As a result thereof, pixels would be randomly corresponded to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, the difference in the pixel intensity and smoothness is considered in the optical flow technique. However, the optical flow technique cannot be used for image transformation since the optical flow technique takes into account only the local movement of an object. Global correspondence can be detected by utilizing the critical point filter according to the base technology.

[1. 3. 3] Determining the mapping with multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, while mappings at other level is being considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint conditions.

Now, when the following equation (15) holds, $$(i',j') = \left(\left\lfloor \frac{i}{2} \right\rfloor, \left\lfloor \frac{j}{2} \right\rfloor\right) \quad (15)$$

$p_{(i',j')}^{(m-1,s)}$ and $q_{(i',j')}^{(m-1,s)}$ are respectively called the parents of $p_{(i,j)}^{(m,s)}$ and $q_{(i,j)}^{(m,s)}$, where $\lfloor x \rfloor$ denotes the largest integer not exceeding x. Conversely, $p_{(i,j)}^{(m,s)}$ and $q_{(i,j)}^{(m,s)}$ are the child of $p_{(i',j')}^{(m-1,s)}$ and the child of $q_{(i',j')}^{(m-1,s)}$, respectively. A function parent (i,j) is defined by the following (16).

$$parent(i, j) = \left(\left\lfloor \frac{i}{2} \right\rfloor, \left\lfloor \frac{j}{2} \right\rfloor\right) \quad (16)$$

A mapping between $p_{(i,j)}^{(m,s)}$ and $q_{(k,l)}^{(m,s)}$ is determined by computing the energy and finding the minimum thereof. The value of $f^{(m,s)}(i,j)=(k,l)$ is determined as follows using $f(m-1,s)$ (m=1,2, ..., n). First of all, imposed is a condition that $q_{(k,l)}^{(m,s)}$ should lie inside a quadrilateral defined by the following (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)}$$
$$q_{g^{(m,s)}(i+1,j+1)}^{(m,s)} q_{g^{(m,s)}(i+1,j-1)}^{(m,s)} \quad (17)$$

where $$g^{(m,s)}(i,j)=f^{(m-1,s)}(parent(i,j))+f^{(m-1,s)}(parent(i,j)+(1,1)) \quad (18)$$

The quadrilateral defined above is hereinafter referred to as the inherited quadrilateral of $p_{(i,j)}^{(m,s)}$. The pixel minimizing the energy is sought and obtained inside the inherited quadrilateral.

Figure 3:
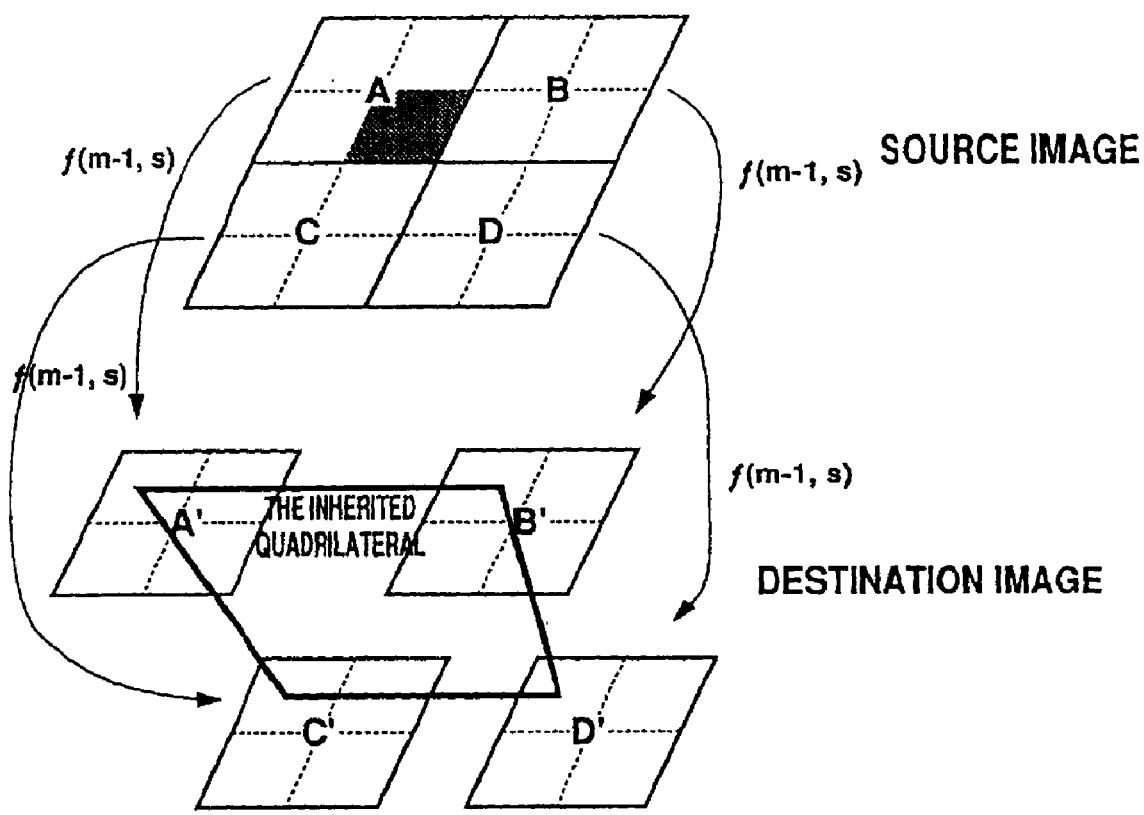
FIG. 3 is a diagram showing the relationship between a source image and a destination image and that between the m-th level and the (m−1)th level, using a quadrilateral.

FIG. 3 illustrates the above-described procedures. The pixels A, B, C and D of the source image are mapped to A', B', C' and D' of the destination image, respectively, at the (m−1)th level in the hierarchy. The pixel $p_{(i,j)}^{(m,s)}$ should be mapped to the pixel $q_{f^{(m)}(i,j)}^{(m,s)}$ which exists inside the inherited quadrilateral A'B'C'D'. Thereby, bridging from the mapping at the (m−1)th level to the mapping at the m-th level is achieved.

The energy $E_0$ defined above is now replaced by the following (19) and (20)

$$E_{0(i,j)}=\|f^{(m,0)}(i,j)-g^{(m)}(i,j)\|^2 \quad (19)$$

$$E_{0(i,j)}=\|f^{(m,s)}(i,j)-f^{(m,s-1)}(i,j)\|^2, (1 \leq i) \quad (20)$$

for computing the submapping $f^{(m,0)}$ and the submapping $f^{(m,s)}$ at the m-th level, respectively.

In this manner, a mapping which keeps low the energy of all the submappings is obtained. Using the equation (20) makes the submappings corresponding to the different critical points associated to each other within the same level in order that the subimages can have high similarity. The equation (19) represents the distance between $f^{(m,s)}(i,j)$ and the location where (i,j) should be mapped when regarded as a part of a pixel at the (m−1)the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}(i,j)$. L is increased until such a pixel is found or L reaches its upper bound $L_{max}^{(m)}$. $L_{max}^{(m)}$ is fixed for each level m. If no such a pixel is found at all, the third condition of the BC is ignored temporarily and such mappings that caused the area of the transformed quadrilateral to become zero (a point or a line) will be permitted so as to determine $f^{(m,s)}(i,j)$. If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will be limited to the very small one, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1. 4] Automatic determination of the optimal parameter values

One of the main deficiencies of the existing image matching techniques lies in the difficulty of parameter adjustment. In most cases, the parameter adjustment is performed manually and it is extremely difficult to select the optical value. However, according to the base technology, the optimal parameter values can be obtained completely automatically.

The systems according to this base technology includes two parameters, namely, λ and η, where λ and η represent the weight of the difference of the pixel intensity and the stiffness of the mapping, respectively. The initial value for these parameters are 0. First, λ is gradually increased from λ=0 while η is fixed to 0. As λ becomes larger and the value of the combined evaluation equation (equation (14)) is minimized, the value of $C_f^{(m,s)}$ for each submapping generally becomes smaller. This basically means that the two images are matched better. However, if λ exceeds the optimal value, the following phenomena (1–4) are caused.
1. Pixels which should not be corresponded are erroneously corresponded only because their intensities are close.
2. As a result, correspondence between images becomes inaccurate, and the mapping becomes invalid.
3. As a result, $D_f^{(m,s)}$ in the equation 14 tends to increase abruptly.
4. As a result, since the value of the equation 14 tends to increase abruptly, $f^{(m,s)}$ changes in order to suppress the abrupt increase of $D_f^{(m,s)}$. As a result, $C_f^{(m,s)}$ increases.

Therefore, a threshold value at which $C_f^{(m,s)}$ turns to an increase from a decrease is detected while a state in which the equation (14) takes the minimum value with λ being increased is kept. Such λ is determined as the optimal value at η=0. Then, the behavior of $C_f^{(m,s)}$ is examined while η is increased gradually, and η will be automatically determined by a method described later. λ will be determined corresponding to such the automatically determined η.

The above-described method resembles the focusing mechanism of human visual systems. In the human visual systems, the images of the respective right eye and left eye are matched while moving one eye. When the objects are clearly recognized, the moving eye is fixed.

[1. 4. 1] Dynamic determination of λ

λ is increased from 0 at a certain interval, and the a subimage is evaluated each time the value of λ changes. As shown in the equation (14), the total energy is defined by $\lambda C_f^{(m,s)}+D_f^{(m,s)}$. $D_{(i,j)}^{(m,s)}$ in the equation (9) represents the smoothness and theoretically becomes minimum when it is the identity mapping. $E_0$ and $E_1$ increase as the mapping is further distorted. Since $E_1$ is an integer, 1 is the smallest step of $D_f^{(m,s)}$. Thus, that changing the mapping reduces the total energy is impossible unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_{(i,j)}^{(m,s)}$ is reduced by more than 1.

Under this condition, it is shown that $C_{(i,j)}^{(m,s)}$ decreases 4in normal cases as $\lambda$ increases. The histogram of $C_{(i,j)}^{(m,s)}$ is denoted as h(l), where h(l) is the number of pixels whose energy $C_{(i,j)}^{(m,s)}$ is $l^2$. In order that $\lambda l^2 \geqq 1$, for example, the case of $l^2 = 1/\lambda$ is considered. When $\lambda$ varies from $\lambda_1$ to $\lambda_2$, a number of pixels (denoted A) expressed by the following (21)

$$A = \sum_{l=\lceil \frac{1}{\lambda_2} \rceil}^{\lvert \frac{1}{\lambda_1} \rvert} h(l) \cong \int_{l=\frac{1}{\lambda_2}}^{\frac{1}{\lambda_1}} h(l) dl = -\int_{\lambda_2}^{\lambda_1} h(l) \frac{1}{\lambda^{3/2}} d\lambda \qquad (21)$$
$$= \int_{\lambda_1}^{\lambda_2} \frac{h(l)}{\lambda^{3/2}} d\lambda$$

changes to a more stable state having the energy (22) which is $$C_f^{(m,s)} - l^2 = C_f^{(m,s)} - \frac{1}{\lambda}. \qquad (22)$$

Here, it is assumed that all the energy of these pixels is approximated to be zero. It means that the value of $C_{(i,j)}^{(m,s)}$ changes by (23).

$$C_f^{(m,s)} = -\frac{A}{\lambda} \qquad (23)$$

As a result, the equation (24) holds.

$$\frac{\partial C_f^{(m,s)}}{\partial \lambda} = -\frac{h(l)}{\lambda^{5/2}} \qquad (24)$$

Since h(l)>0, $C_f^{(m,s)}$ decreases in normal case. However, when $\lambda$ tends to exceed the optimal value, the above phenomenon that is characterized by the increase in $C_f^{(m,s)}$ occurs. The optimal value of $\lambda$ is determined by detecting this phenomenon.

When $$h(l) = Hl^k = \frac{H}{\lambda^{k/2}} \qquad (25)$$

is assumed where both H(h>0) and k are constants, the equation (26) holds.

$$\frac{\partial C_f^{(m,s)}}{\partial \lambda} = -\frac{H}{\lambda^{5/2+k/2}} \qquad (26)$$

Then, if $k \neq -3$, the following (27) holds.

$$C_f^{(m,s)} = C + \frac{H}{(3/2 + k/2)\lambda^{3/2+k/2}} \qquad (27)$$

The equation (27) is a general equation of $C_f^{(m,s)}$ (where C is a constant).

When detecting the optimal value of $\lambda$, the number of pixels violating the BC may be examined for safety. In the course of determining a mapping for each pixel, the probability of violating the BC is assumed $p_0$ here. In that case, since $$\frac{\partial A}{\partial \lambda} = \frac{h(l)}{\lambda^{3/2}} \qquad (28)$$

holds, the number of pixels violating the BC increases at a rate of the equation (29).

$$B_0 = \frac{h(l)p_0}{\lambda^{3/2}} \qquad (29)$$

Thus, $$\frac{B_0 \lambda^{3/2}}{p_0 h(l)} = 1 \qquad (30)$$

is a constant. If assumed that $h(l) = Hl^k$, the following (31), for example, $$B_0 \lambda^{3/2+k/2} = p_0 H \qquad (31)$$

becomes a constant. However, when $\lambda$ exceeds the optimal value, the above value of (31) increases abruptly. By detecting this phenomenon, whether or not the value of $B_0 \lambda^{3/2+k/2}/2^m$ exceeds an abnormal value $B_{0thres}$ exceeds is inspected, so that the optimal value of can be determined. Similarly, whether or not the value of $B_1 \lambda^{3/2+k/2}/2^m$ exceeds an abnormal value $B_{thres}$, so that the increasing rate $B_1$ of pixels violating the third condition of the BC is checked. The reason why the fact $2^m$ is introduced here will be described at a later stage. This system is not sensitive to the two threshold values $B_{0thres}$ and $B_{1thres}$. The two threshold values $B_{0thres}$ and $B_{1thres}$ can be used to detect the excessive distortion of the mapping which is failed to be detected through the observation of the energy $C_f^{(m,s)}$.

In the experimentation, the computation of $f^{(m,s)}$ is stopped and then the computation of $f^{(m,s+1)}$ is started when $\lambda$ exceeded 0.1. That is because the computation of submappings is affected by the difference of mere 3 out of 255 levels in the pixel intensity when $\lambda > 0.1$, and it is difficult to obtain a correct result when $\lambda > 0.1$.

[1. 4. 2] Histogram h(l)

The examination of $C_f^{(m,s)}$ does not depend on the histogram h(l). The examination of the BC and its third condition may be affected by the h(l). k is usually close to 1 when ($\lambda$, $C_f^{(m,s)}$ is actually plotted. In the experiment, k=1 is used, that is, $B_0 \lambda^2$ and $B_1 \lambda^2$ are examined. If the true value of k is less than 1, $B_0 \lambda^2$ and $B_1 \lambda^2$ does not become constants and increase gradually by the factor of $\lambda^{(1-k)/2}$. If h(l) is a constant, the factor is, for example, $\lambda^{1/2}$. However, such a difference can be absorbed by setting the threshold $B_{0thres}$ appropriately.

Let us model the source image by a circular object with its center at $(x_0, y_0)$ and its radius r, given by:

$$p(i, j) = \qquad (32)$$
$$\begin{cases} \frac{255}{r} c\left(\sqrt{(i-x_0)^2 + (j-y_0)^2}\right) & \ldots \left(\sqrt{(i-x_0)^2 + (j-y_0)^2} \leq r\right) \\ 0 & \ldots \text{(otherwise)} \end{cases}$$

and the destination image given by:

$$q(i, j) = \qquad (33)$$

-continued $$\begin{cases} \frac{255}{r} c\left(\sqrt{(i-x_1)^2 + (j-y_1)^2}\right) \dots \left(\sqrt{(i-x_1)^2 + (j-y_1)^2} \le r\right) \\ 0 \dots \text{(otherwise)} \end{cases}$$

with its center at $(x_1, y_1)$ and radius r. Let c(x) has the form of $c(x)=x^k$. When the centers $(x_0, y_0)$ and $(x_1, y_1)$ are sufficiently far from each other, the histogram h(l) is then in the form of:

$$h(l) \propto rl^k (k \ne 0) \tag{34}$$

When k=1, the images represent objects with clear boundaries embedded in the backgrounds. These objects become darker toward their centers and brighter toward their boundaries. When k=−1, the images represent objects with vague boundaries. These objects are brightest at their centers, and become darker toward boundaries. Without much loss of generality, it suffices to state that objects in general are between these two types of objects. Thus, k such that −1≦k≦1 can cover the most cases, and it is guaranteed that the equation (27) is generally a decreasing function.

As can be observed from the above equation (34), attention must be directed to the fact that r is influenced by the resolution of the image, namely, r is proportional to $2^m$. That is why the factor $2^m$ was introduced in the above section [1.4.1].

[1. 4. 3] Dynamic determination of η

The parameter η can also be automatically determined in the same manner. Initially, η is set to zero, and the final mapping $f^{(n)}$ and the energy $C_f^{(n)}$ at the finest resolution are computed. Then, after η is increased by a certain value Δ and the final mapping $f^{(n)}$ and the energy $C_f^{(n)}$ at the finest resolution are again computed. This process is repeated until the optimal value is obtained. η represents the stiffness of the mapping because it is a weight of the following equation (35).

$$E_{0(i,j)}^{(m,s)} = \|f^{(m,s)}(i,j) - f^{(m,s-1)}(i,j)\|^2 \tag{35}$$

Figure 4:
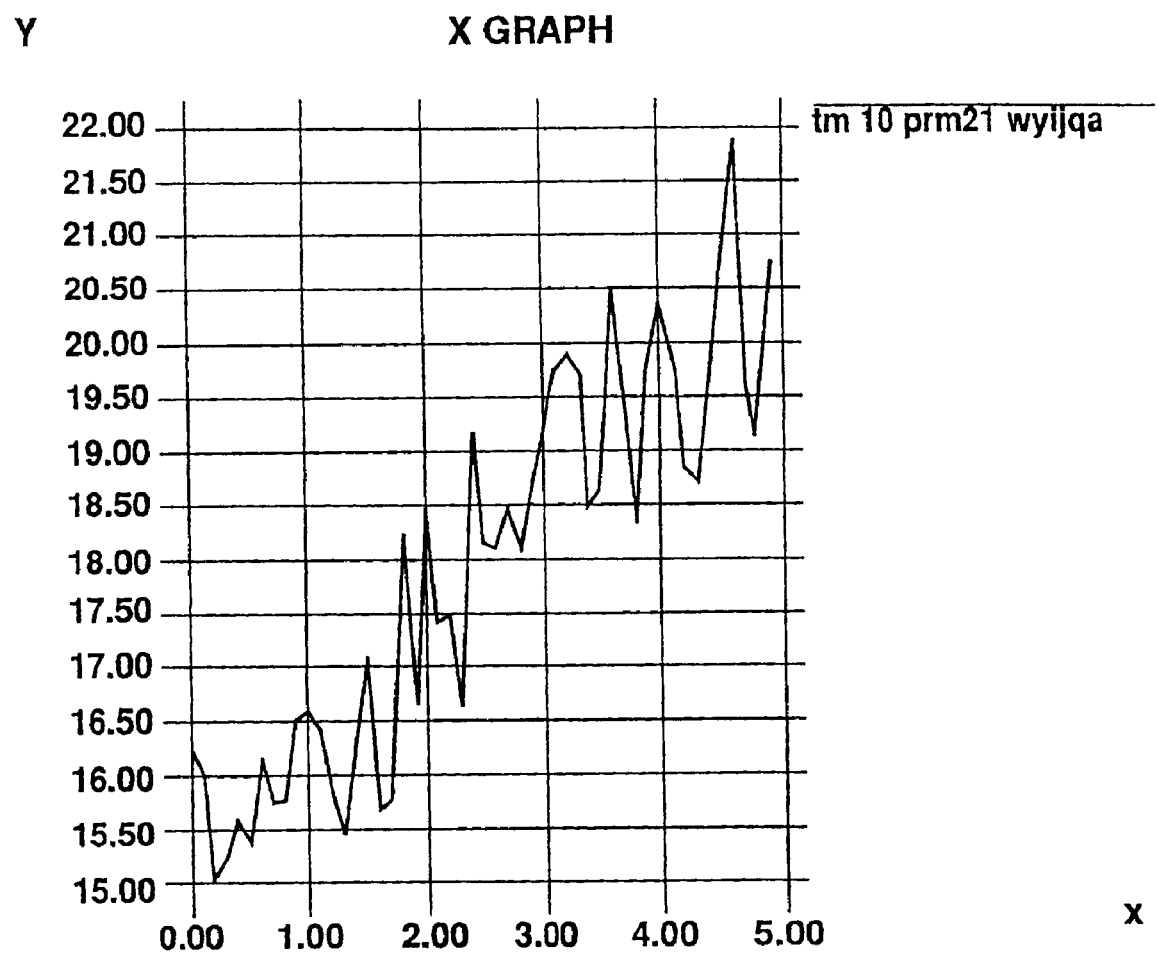
FIG. 4 shows the relationship between a parameter η (represented by x-axis) and energy $C_f$ (represented by y-axis).

When η is zero, $D_f^{(n)}$ is determined irrespective of the previous submapping, and the present submapping would be elastically deformed and become too distorted. On the other hand, when η is a very large value, $D_f^{(n)}$ is almost completely determined by the immediately previous submapping. The submappings are then very stiff, and the pixels are mapped to almost the same locations. The resulting mapping is therefore the identity mapping. When the value of η increases from 0, $C_f^{(n)}$ gradually decreases as will be described later. However, when the value of η exceeds the optimal value, the energy starts increasing as shown in FIG. 4. In FIG. 4, the x-axis represents η, and y-axis represents $C_f$.

The optimum value of n which minimizes $C_f^{(n)}$ can be obtained in this manner. However, since various elements affects the computation compared to the case of λ, $C_f^{(n)}$ changes while slightly fluctuating. This difference is caused because a submapping is re-computed once in the case of λ whenever an input changes slightly, whereas all the submappings must be re-computed in the case of η. Thus, whether the obtained value of $C_f^{(n)}$ is the minimum or not cannot be judged instantly. When candidates for the minimum value are found, the true minimum needs to be searched by setting up further finer interval.

[1. 5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, so that $f^{(m,s)}$ having the intensity at non-integer points $$V(q_{f^{(m,s)}_{i,j}}^{(m,s)}) \tag{36}$$

is provided. Namely, supersampling is performed. In its actual implementation, $f^{(m,s)}$ is allowed to take integer and half integer values, and $$V(q_{(i,j)+(0.5, 0.5)}^{(m,s)}) \tag{37}$$

is given by $$(V(q_{(i,j)}^{(m,s)}) + V(q_{(i,j)+(1,1)}^{(m,s)}))/2 \tag{38}$$

[1. 6] Normalization of the pixel intensity of each image

When the source and destination images contain quite different objects, the raw pixel intensity may not be used to compute the mapping because a large difference in the pixel intensity causes excessively large energy $C_f^{(m,s)}$ relating the intensity, thus making it difficult to perform the correct evaluation.

For example, the matching between a human face and a cat's face is computed as shown in FIGS. 20(a) and 20(b). The cat's face is covered with hair and is a mixture of very bright pixels and very dark pixels. In this case, in order to compute the submappings of the two faces, its subimages are normalized. Namely, the darkest pixel intensity is set to 0 while the brightest pixel intensity is set to 255, and other pixel intensity values are obtained using the linear interpolation.

[1. 7] Implementation

In the implementation, utilized is a heuristic method where the computation proceeds linearly as the source image is scanned. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is reset to zero. Thereafter, $f^{(m,s)}$ (i, j) is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, it is determined starting from the top rightmost location while decreasing i and increasing j. When (s mod 4) is 2, it is determined starting from the bottom rightmost location while decreasing both i and j. When (s mod 4) is 3, it is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In the actual implementation, the values of $f^{(m,s)}$ (i,j) (m=0, . . . ,n) that satisfy the BC are chosen as much as possible, from the candidates (k,l) by awarding a penalty to the candidates violating the BC. The energy $D_{(k,l)}$ of the candidate that violates the third condition of the BC is multiplied by $\phi$ and that of a candidate that violates the first or second condition of the BC is multiplied by $\phi$. In the actual implementation, $\phi=2$ and $\phi=100000$ are used.

In order to check the above-mentioned BC, the following test is performed as the actual procedure when determining $(k,l)=f^{(m,s)}(i,j)$. Namely, for each grid point $(k,l)$ in the inherited quadrilateral of $f^{(m,s)}(i,j)$, whether or not the z-component of the outer product of $$W = \vec{A} \times \vec{B} \tag{39}$$

is equal to or greater than 0 is examined, where $$\vec{A} = \overrightarrow{q^{(m,s)}_{f^{(m,s)}(i,j-1)} q^{(m,s)}_{f^{(m,s)}(i+1,j-1)}} \tag{40}$$

$$\vec{B} = \overrightarrow{q^{(m,s)}_{f^{(m,s)}(i,j-1)} q^{(m,s)}_{(k,l)}} \tag{41}$$

Here, the vectors are regarded as 3D vectors and the z-axis is defined in the orthogonal right-hand coordinate system. When W is negative, the candidate is awarded a penalty by multiplying $D_{(k,l)}^{(m,s)}$ by $\phi$ so as not to be selected as much as possible.

Figure 5A:
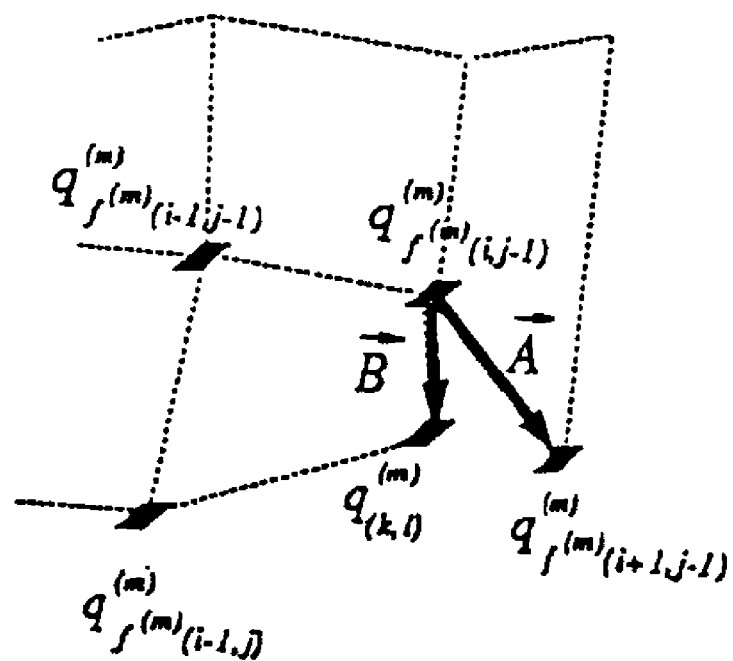
FIG. 5a is a diagram illustrating determination of whether or not the mapping for a certain point satisfies the bijectivity condition through the outer product computation.
Figure 5B:
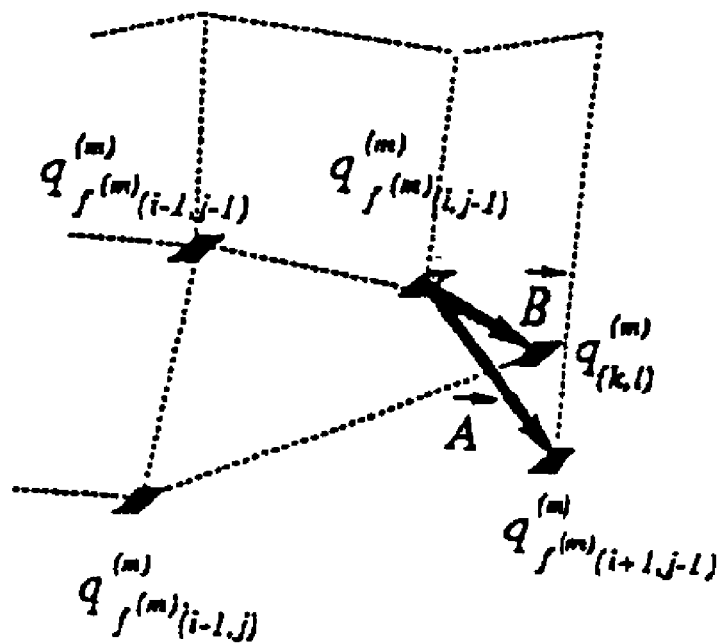
FIG. 5b is a diagram illustrating determination of whether or not the mapping for a certain point satisfies the bijectivity condition through the outer product computation.

FIGS. 5a and 5b illustrate the reason why this condition is inspected. FIG. 5a shows a candidate without a penalty and FIG. 5b shows one with a penalty. When determining the mapping $f^{(m,s)}(i,j+1)$ for the adjacent pixel at $(i,j+1)$, there is no pixel on the source image plane that satisfies the BC if the z-component of W is negative because then $q_{(k,l)}^{(m,s)}$ passes the boundary of the adjacent quadrilateral.

[1. 7. 1] The order of submappings

In the actual implementation, $\sigma(0)=0$, $\sigma(1)=1$, $\sigma(2)=2$, $\sigma(3)=3$, $\sigma(4)=0$ were used when the resolution level was even, while $\sigma(0)=3$, $\sigma(1)=2$, $\sigma(2)=1$, $\sigma(3)=0$, $\sigma(4)=3$ were used when the resolution level was odd. Thus, the submappings are shuffled in an approximately manner. It is to be noted that the submapping is primarily of four types, and s may be any one among 0 to 3. However, a processing with s=4 was actually performed for the reason described later.

[1. 8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed 1. The intermediate image pixels $r(x,y,t)$ ($0 \leq x \leq N-1$, $0 \leq y \leq M-1$) whose distance from the source image plane is t ($0 \leq t \leq 1$) are obtained as follows. First, the location of the pixel $r(x,y,t)$, where $x,y,t \in R$, is determined by the equation (42).

$$(x,y)=(1-dx)(1-dy)(1-t)(i,j)+(1-dx)(1-dy)tf(i,j)+ dx(1-dy)(1-t)(i+1,j)+dx(1-dy)tf(i+1,j)$$

$$+(1-dx)dy(1-t)(i,j+1)+(1-dx)dytf(i,j+1)+dxdy(1-t)(i+1,j+1)+ dxdytf(i+1,j+1) \tag{42}$$

The value of the pixel intensity at $r(x,y,t)$ is then determined by the equation (43).

$$V(r(x,y,t))=(1-dx)(1-dy)(1-t)V(p_{i,j})+(1-dx)(1-dy)tV(q_{f(i,j)})+ dx(1-dy)(1-t)V(p_{i+1,j})+dx(1-dy)tV(q_{f(i+1,j)})$$

$$+(1-dx)dy(1-t)V(p_{i,j+1})+(1-dx)dytV(q_{f(i,j+1)})+ dxdy(1-t)V(p_{i+1,j+1})+dxdytV(q_{f(i+1,j+1)}) \tag{43}$$

where dx and dy are parameters varying from 0 to 1.

[1. 9] Mapping to which constraints are imposed

So far, the determination of the mapping to which no constraint is imposed has been described. However, when a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination images and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of the specified pixels are mapped to the locations near the position to which the specified one is mapped. Here, the approximate mapping at the m-th level in the resolution hierarchy is denoted by $F^{(m)}$.

The approximate mapping F is determined in the following manner. First, the mapping for several pixels are specified. When $n_s$ pixels $$p(i_0,j_0),p(i_1,j_1),\ldots,p(i_{n_s-1},j_{n_s-1}) \tag{44}$$

of the source image are specified, the following values in the equation (45) are determined.

$$F^{(n)}(i_0,j_0)=(k_0,l_0),$$

$$F^{(n)}(i_1,j_1)=(k_1,l_1),$$

$$F^{(n)}(i_{n_s-1},j_{n_s-1})=(k_{n_s-1},l_{n_s-1}) \tag{45}$$

For the remaining pixels of the source image, the amount of displacement is the weighted average of the displacement of $p(i_h,j_h)$ ($h=0,\ldots,n_s-1$). Namely, a pixel $p_{(i,j)}$ is mapped to the following pixel (expressed by the equation (46)) of the destination image.

$$F^{(m)}(i,j) = \frac{(i,j) + \sum_{h=0}^{h=n_s-1}(k_h - i_h, l_h - j_h)weight_h(i,j)}{2^{n-m}} \tag{46}$$

where $$weight_h(i,j) = \frac{1/\|(i_h-i, j_h-j)\|^2}{\text{total\_weight}(i,j)} \tag{47}$$

where $$\text{total\_weight}(i,j) = \sum_{h=0}^{h=n_s-1} 1/\|(i_h-i, j_h-j)\|^2 \tag{48}$$

Second, the energy $D_{(i,j)}^{(m,s)}$ of the candidate mapping f is changed so that mapping f similar to $F^{(m)}$ has a lower energy. Precisely speaking, $D_{(i,j)}^{(m,s)}$ is expressed by the equation (49).

$$D_{(i,j)}^{(m,s)} = E_{0(i,j)}^{(m,s)} + \eta E_{1(i,j)}^{(m,s)} + \kappa E_{2(i,j)}^{(m,s)} \tag{49}$$

$$E_{2(i,j)}^{(m,s)} = \tag{50}$$

$$\begin{cases} 0, & \text{if } \|F^{(m)}(i,j) - f^{(m,s)}(i,j)\|^2 \leq \left\lfloor \dfrac{\rho^2}{2^{2(n-m)}} \right\rfloor \\ \|F^{(m)}(i,j) - f^{(m,s)}(i,j)\|^2, & \text{otherwise} \end{cases}$$

where $\kappa, \rho \geq 0$. Finally, the mapping f is completely determined by the above-described automatic computing process of mappings.

Note that $E_{2(i,j)}^{(m,s)}$ becomes 0 if $f^{(m,s)}(i,j)$ is sufficiently close to $F^{(m)}(i,j)$ i.e., the distance therebetween is equal to or less than $$\left\lfloor \dfrac{\rho^2}{2^{2(n-m)}} \right\rfloor \tag{51}$$

It is defined so because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail, and the source image is automatically mapped so that the source image matches the destination image.

[2] Concrete Processing Procedure

The flow of the process utilizing the respective elemental techniques described in [1] will be described.

Figure 6:
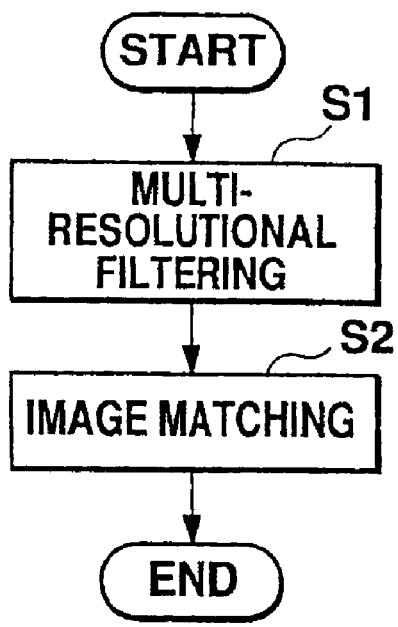
FIG. 6 is a flowchart of the entire procedure of a preferred embodiment in the base technology.

FIG. 6 is a flowchart of the entire procedure of the base technology. Referring to FIG. 6, a processing using a multiresolutional critical point filter is first performed (S1). A source image and a destination image are then matched (S2). S2 is not indispensable, and other processings such as image recognition may be performed instead, based on the characteristics of the image obtained at S1.

Figure 7:
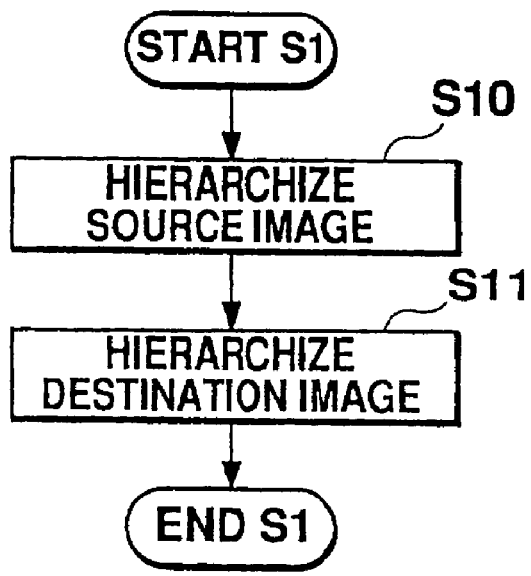
FIG. 7 is a flowchart showing the details of the process at S1 in FIG. 6.

FIG. 7 is a flowchart showing the details of the process at S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel.

Figure 8:
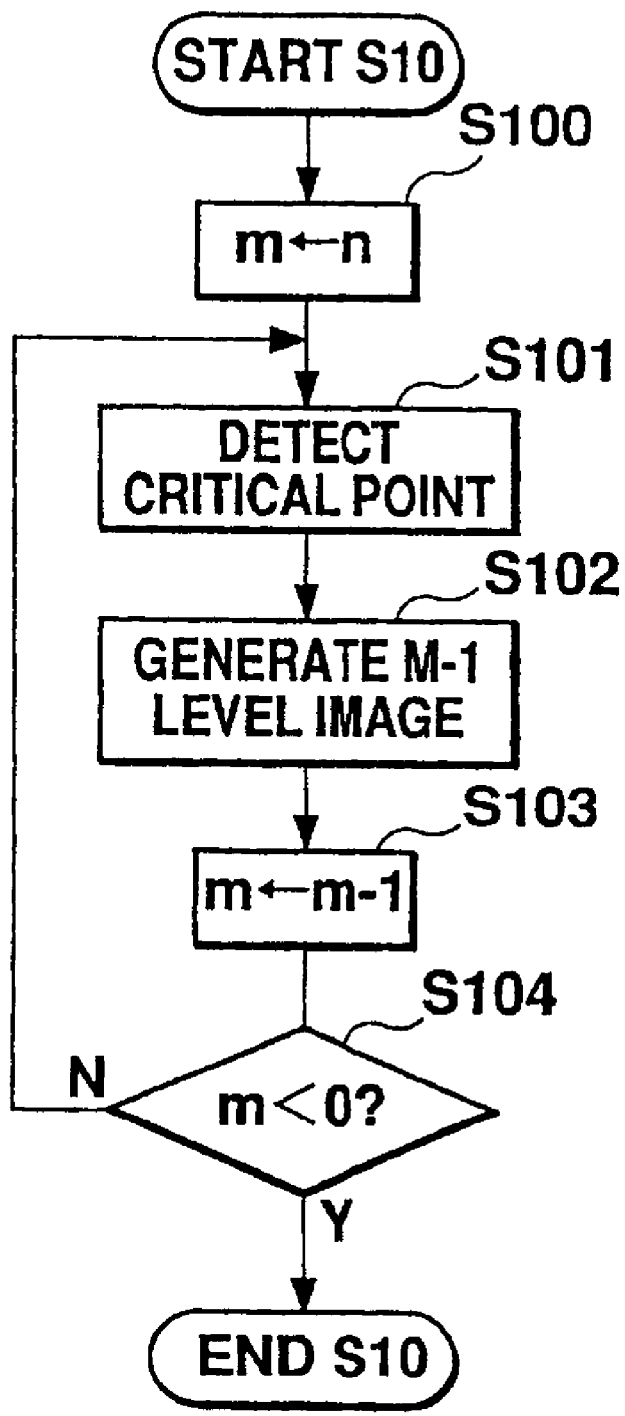
FIG. 8 is a flowchart showing the details of the process at S10 in FIG. 7.

FIG. 8 is a flowchart showing the details of the process at S10 shown in FIG. 7. Suppose that the size of the original source image is $2^n \times 2^n$. Since source hierarchical images are sequentially generated from one with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m,3)}$ of the m-th level of resolution, using a critical point filter (S101), so that the images $p^{(m-1,0)}$, $p^{(m-1,1)}$, $p^{(m-1,2)}$ and $p^{(m-1,3)}$ of the (m−1)th level are generated (S102). Since m=n here, $p^{(m,0)}=p^{(m,1)}=p^{(m,2)}=p^{(m,3)}=p^{(n)}$ holds and four types of subimages are thus generated from a single source image.

Figure 9:
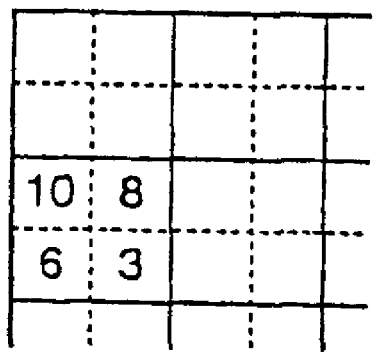
FIG. 9 is a diagram showing correspondence between partial images of the m-th and (m−1)th levels of resolution.
Figure 9:
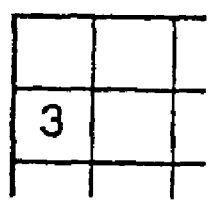
Figure 9:
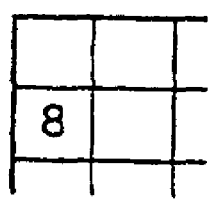
Figure 9:
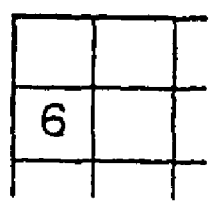
Figure 9:
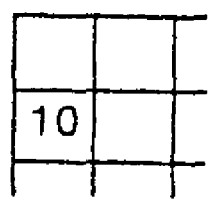

FIG. 9 shows correspondence between partial images of the m-th and those of (m−1)th levels of resolution. Referring to FIG. 9, respective values represent the intensity of respective pixels. $p^{(m,s)}$ symbolizes four images $p(m,0)$ through $p^{(m,3)}$, and when generating $p^{(m-1,0)}$, $p^{(m,s)}$ is regarded as $p^{(m,0)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m−1)th level by respective single pixels acquired thus. Therefore, the size of the subimages at the (m−1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
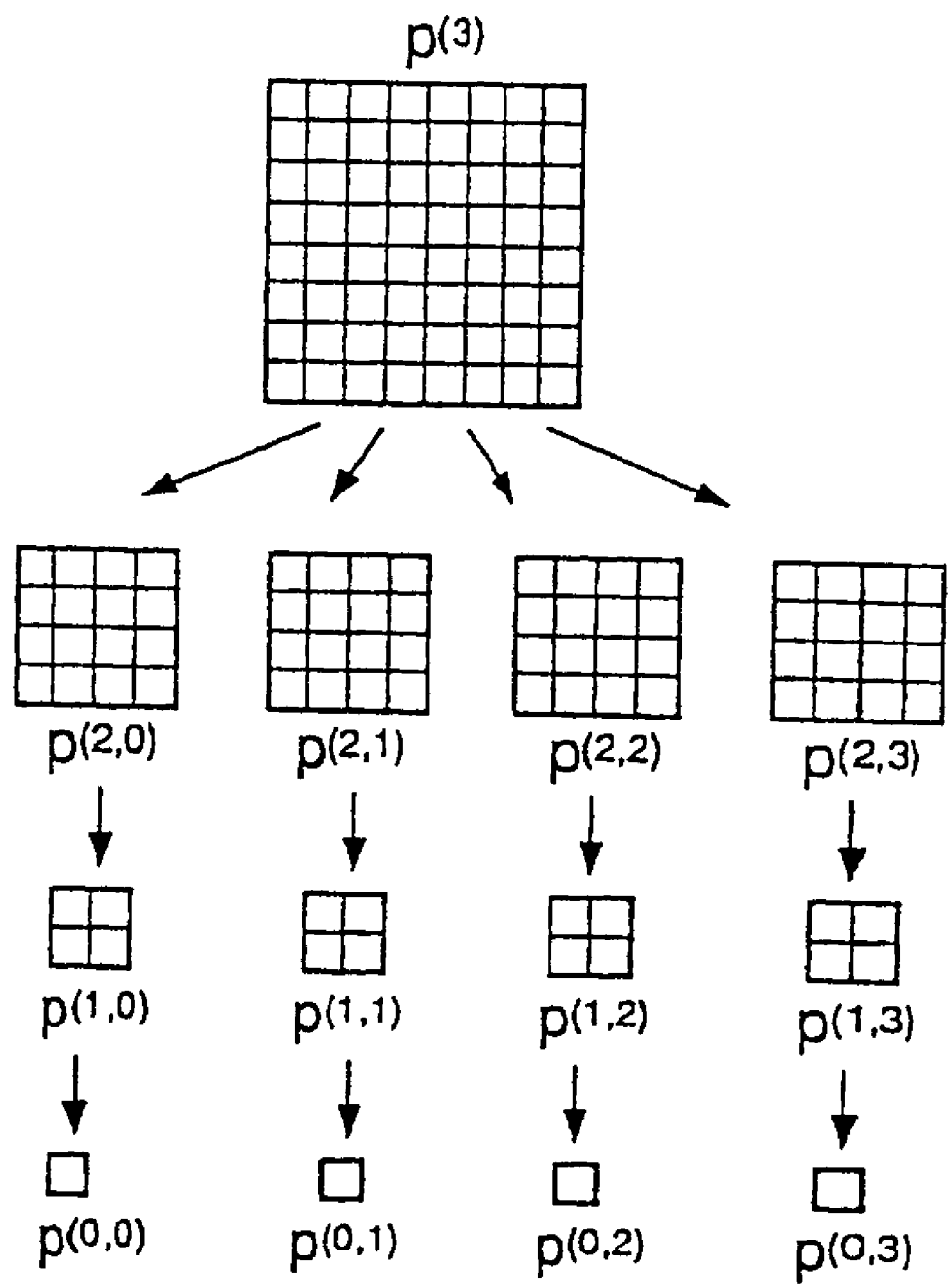
FIG. 10 is a diagram showing source images generated in the embodiment in the base technology.

FIG. 10 shows source hierarchical images generated at S10 in the case of n=3. The initial source image is the only image common to the four series followed. The four types of subimages are generated independently, depending on the type of a critical point. Note that the process in FIG. 8 is common to S11 shown in FIG. 7, and that destination hierarchical images are generated through the similar procedure. Then, the process by S1 shown in FIG. 6 is completed.

Figure 11:
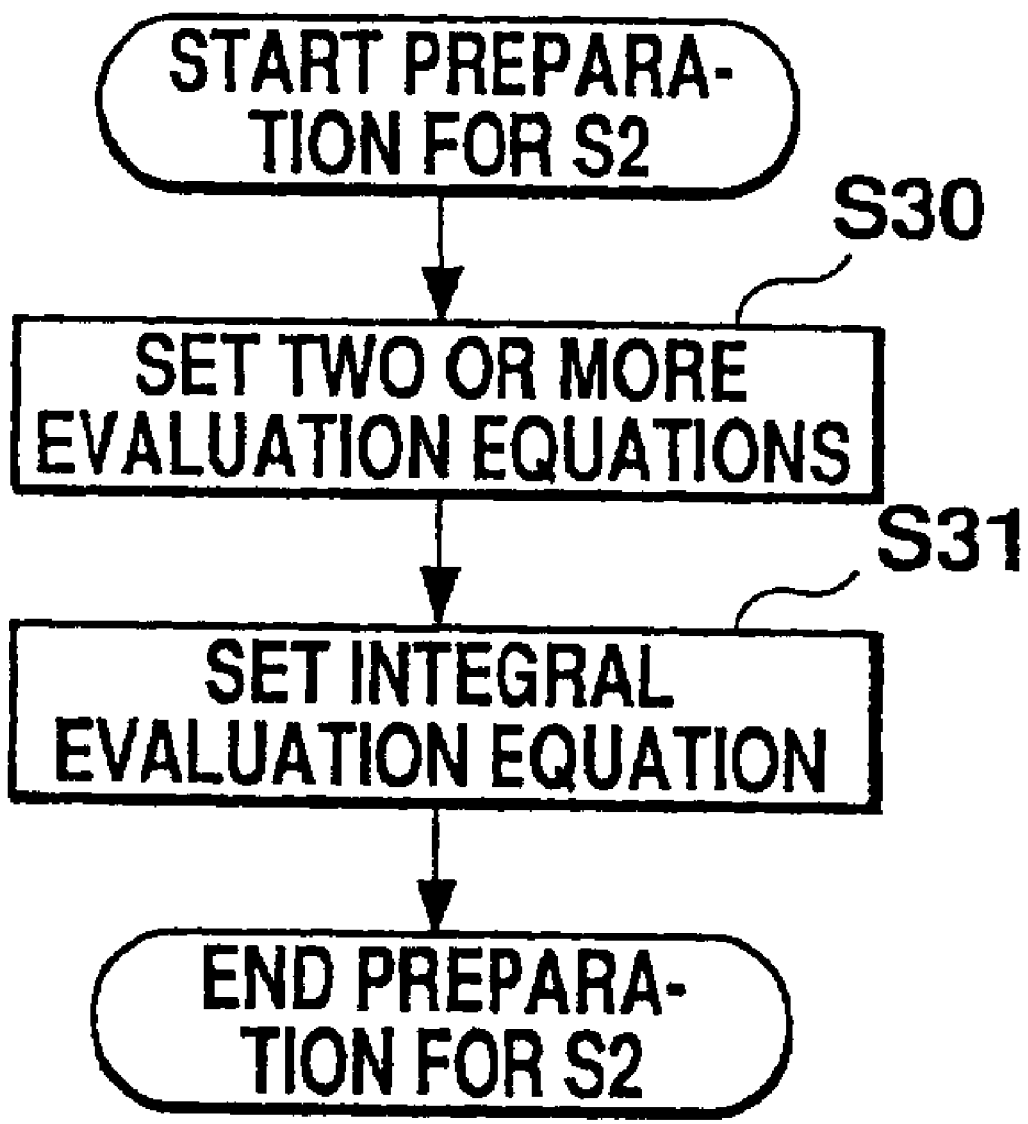
FIG. 11 is a flowchart of a preparation procedure for S2 in FIG. 6.

In the base technology, in order to proceed to S2 shown in FIG. 6 a matching evaluation is prepared. FIG. 11 shows the preparation procedure. Referring to FIG. 11, a plurality of evaluation equations are set (S30). Such the evaluation equations include the energy $C_f^{(m,s)}$ concerning a pixel value, introduced in [1.3.2.1], and the energy $D_f^{(m,s)}$ concerning the smoothness of the mapping introduced in [1.3.2.2]. Next, by combining these evaluation equations, a combined evaluation equation is set (S31). Such the combined evaluation equation includes $\lambda C_{(i,j)}^{(m,s)} + D_f^{(m,s)}$. Using $\eta$ introduced in [1.3.2.2], we have $$\Sigma\Sigma(\lambda C_{(i,j)}^{(m,s)} + \eta E_{0(i,j)}^{(m,s)} + E_{1(i,j)}^{(m,s)}) \tag{52}$$

In the equation (52) the sum is taken for each i and j where i and j run through $0, 1, \ldots, 2^{m-1}$. Now, the preparation for matching evaluation is completed.

Figure 12:
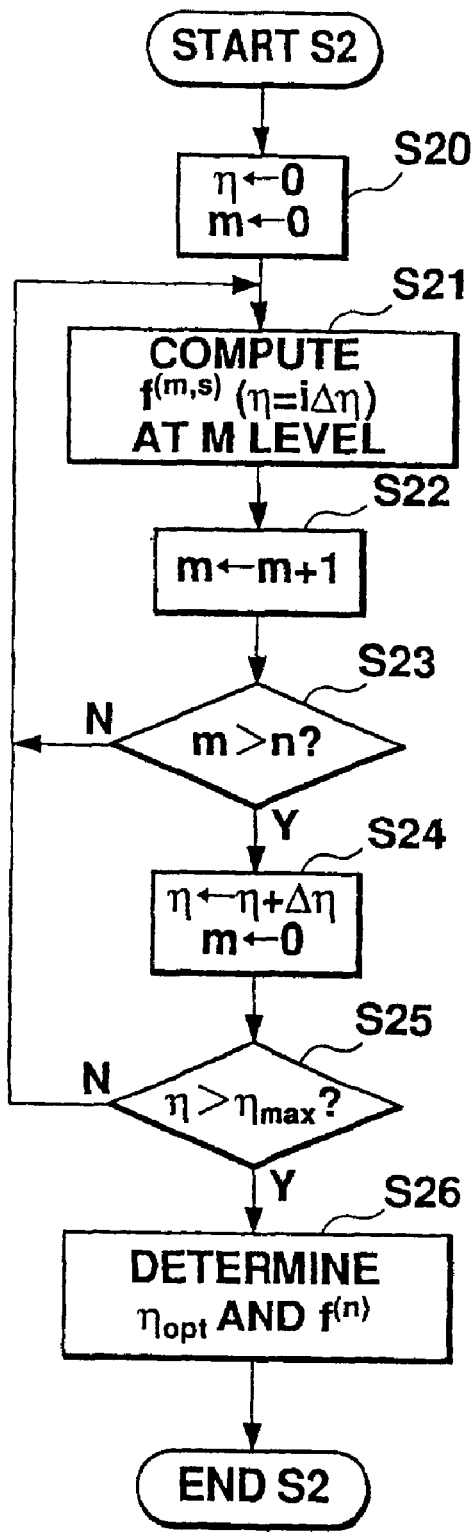
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global corresponding correctly, a matching is calculated in sequence from a coarse level to a fine level of resolution. Since the source and destination hierarchical images are generated by use of the critical point filter, the location and intensity of critical points are clearly stored even at a coarse level. Thus, the result of the global matching is far superior to the conventional method.

Referring to FIG. 12, a coefficient parameter $\eta$ and a level parameter m are set to 0 (S20). Then, a matching is computed between respective four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m−1)th level, as indicated by the equations (17) and (18). Thus, the matching computed at a coarser level of resolution is used in subsequent calculation of a matching. This is a vertical reference between different levels. If m=0, there is no coarser level and the process, but this exceptional process will be described using FIG. 13.

On the other hand, a horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$). This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one is referred to since there is no other submapping at the same level to be referred to as shown in the equation (19). In the experiment, however, a procedure is adopted such that after the submappings were obtained up to $f^{(m,3)}$, $f^{(m,0)}$ is renewed once utilizing the thus obtained subampings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
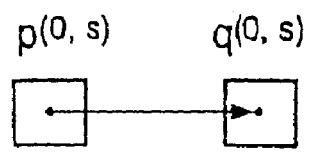
FIG. 13 is a diagram showing the way a submapping is determined at the 0-th level.
Figure 14:
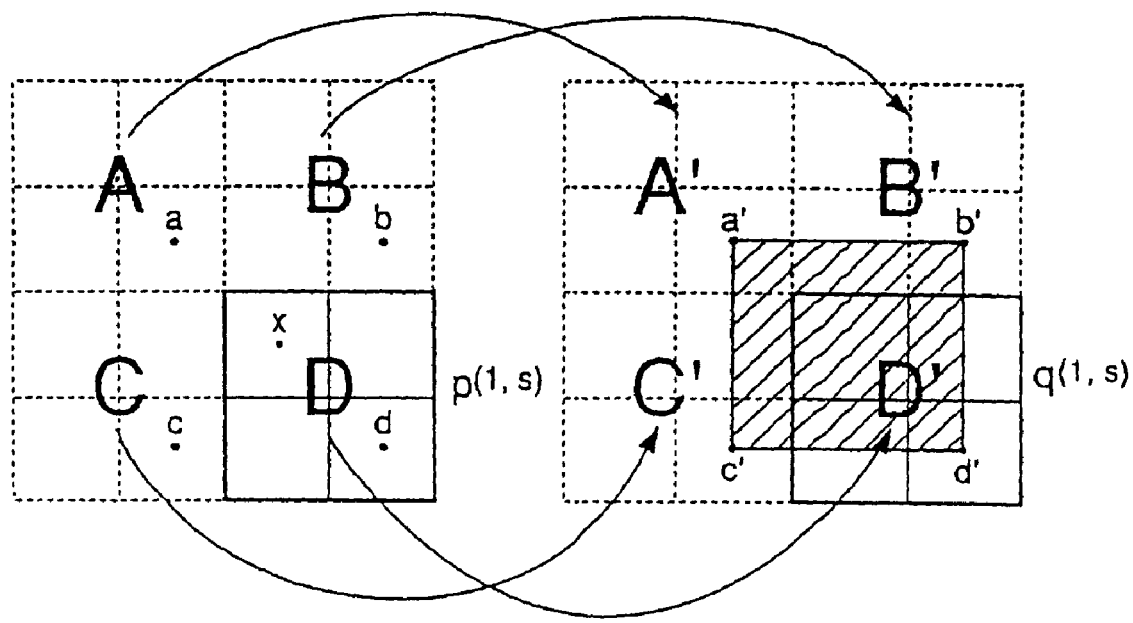
FIG. 14 is a diagram showing the way a submapping is determined at the first level.

FIG. 13 illustrates how the submapping is determined at the 0-th level. Since at the 0-th level each sub-image is consitituted by a single pixel, the four submappings $f^{(0,s)}$ is automatically chosen as the identity mapping. FIG. 14 shows how the submappings are determined at the first level. At the first level, each of the sub-images is constituted of four pixels, which are indicated by a solid line. When a corresponding point (pixel) of the point (pixel) x in $p^{(l,s)}$ is searched within $q^{(l,s)}$, the following procedure is adopted.

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the points A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the upper right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}$ ($\eta$=0) because it has been determined relative to $\eta$=0.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$(S25), the process returns to S21 and the mapping $f^{(n)}$ ($\eta$=$\Delta\eta$) relative to the new $\eta$ is obtained. This process is repeated while obtaining $f^{(n)}$($\eta$=i$\Delta\eta$) (i=0, 1, . . . ) at S21. When $\eta$ exceeds $\eta_{max}$, the process proceeds to S26 and the optimal $\eta$=$\eta_{opt}$ is determined using a method described later, so as to let $f^{(n)}$($\eta$=$\eta_{opt}$) be the final mapping $f^{(n)}$.

Figure 15:
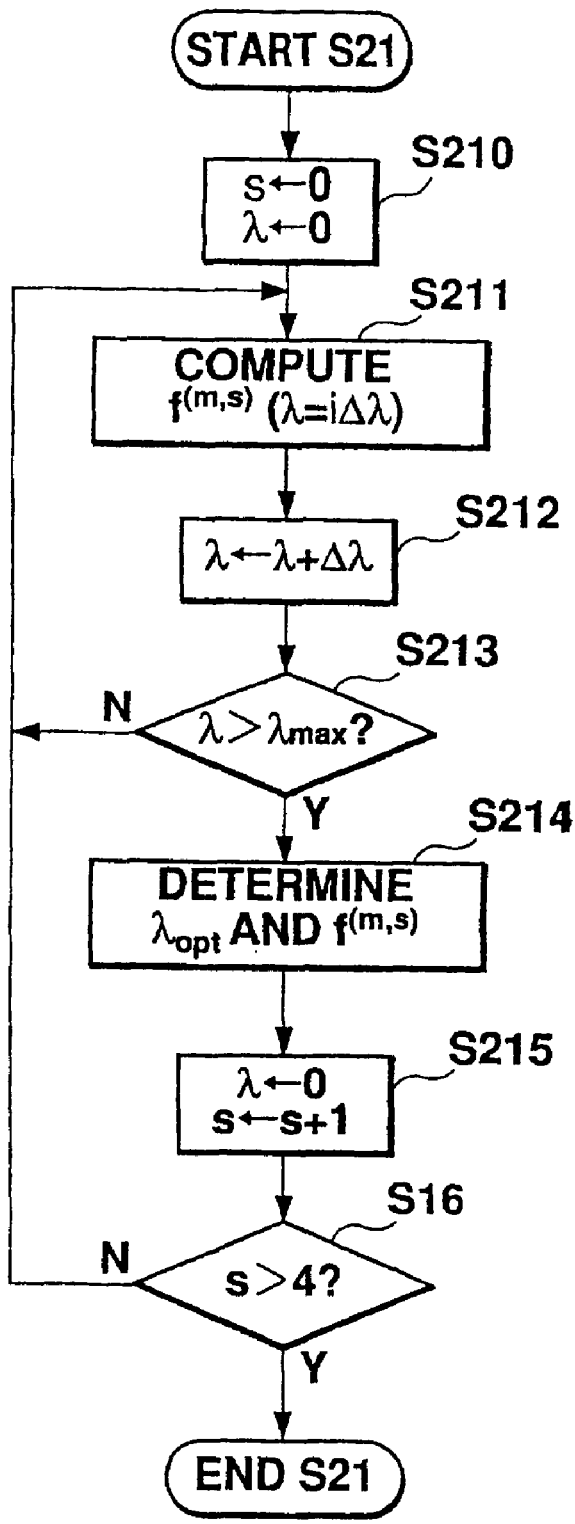
FIG. 15 is a flowchart showing the details of the process at S21 in FIG. 6.

FIG. 15 is a flowchart showing the details of the process of S21 shown in FIG. 12. According to this flowchart, the submappings at the m-th level are determined for a certain predetermined $\eta$. When determining the mappings, the optimal $\lambda$ is defined independently for each submapping in the base technology.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained is denoted as $f^{(m,s)}$ ($\lambda$=0). In order to obtain the mapping with respect to other different $\lambda$, $\lambda$ is shifted by $\Delta\lambda$. After confirming that new $\lambda$ does not exceed a predetermined search-stop value $\lambda_{max}$ (S213), the process returns to S211 and the mapping $f^{(m,s)}$ ($\lambda$=$\Delta\lambda$) relative to the new $\lambda$ is obtained. This process is repeated while obtaining $f^{(m,s)}$($\lambda$=i$\Delta\lambda$) (i=0,1, . . . ). When $\lambda$ exceeds $\lambda_{max}$, the process proceeds to S214 and the optimal $\lambda$=$\lambda_{opt}$ is determined, so as to let $f^{(n)}$ ($\lambda$=$\lambda_{opt}$) be the final mapping $f^{(m,s)}$ (S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
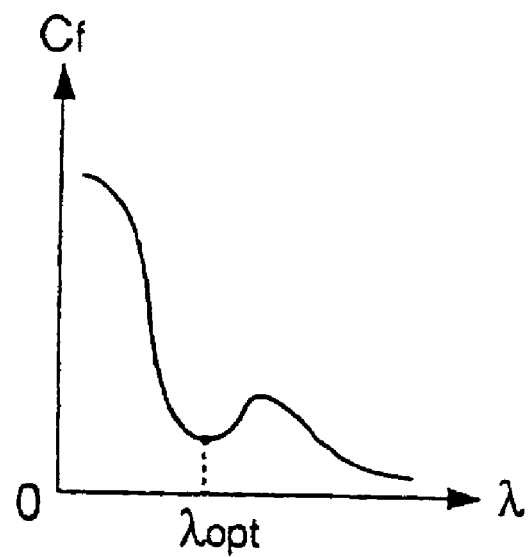
FIG. 16 is a graph showing the behavior of energy $C_f^{(m,s)}$ corresponding to $f^{(m,s)}$ ($\lambda=i\Delta\lambda$) which has been obtained for a certain $f^{(m,s)}$ while changing λ.

FIG. 16 shows the behavior of the energy $C_f^{(m,s)}$ corresponding to $f^{(m,s)}$ ($\lambda$=i$\Delta\lambda$) (i=0,1, . . . ) for a certain m and s while varying $\lambda$. Though described in [1.4], as $\lambda$ increases, $C_f^{(m,s)}$ normally decreases but changes to increase after $\lambda$ exceeds the optimal value. In this base technology, $\lambda$ in which $C_f^{(m,s)}$ becomes the minima is defined as $\lambda_{opt}$. As observed in FIG. 16, even if $C_f^{(m,s)}$ turns to decrease again in the range $\lambda$>$\lambda_{opt}$, the mapping will be spoiled by then and becomes meaningless. For this reason, it suffices to pay attention to the first occurring minima value. $\lambda_{opt}$ is independently determined for each submapping including $f^{(n)}$.

Figure 17:
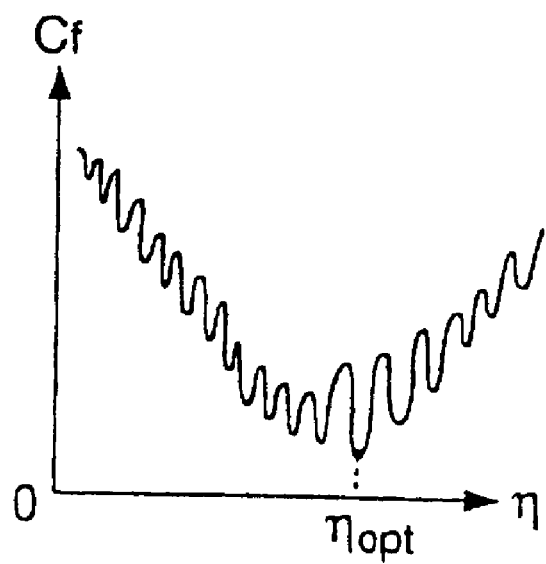
FIG. 17 is a diagram showing the behavior of energy $C_f^{(n)}$ corresponding to $f^{(n)}$ (η=iΔη) (i=0,1, . . . ) which has been obtained while changing η.

FIG. 17 shows the behavior of the energy $C_f^{(n)}$ corresponding to $f^{(n)}$ ($\eta$=i$\Delta\eta$) (i=0,1, . . . ) while varying $\eta$. Here too, $C_f^{(n)}$ normally decreases as $\eta$ increases, but $C_f^{(n)}$ changes to increase after $\eta$ exceeds the optimal value. Thus, $\eta$ in which $C_f^{(n)}$ becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to the object recognition, characteristic extraction, and image matching. As a result, it is possible to construct an image processing system which significantly reduces manual labors.

Some extensions to or modifications of the above-described base technology may be made as follows:

(1) Parameters are automatically determined when the matching is computed between the source and destination hierarchical images in the base technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}=\alpha E_0+E_1$, may be used as a combined evaluation equation. While paying attention to the neighborhood of the extrema in this combined evaluation equation, a is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ in the base technology or more than two parameters. When there are more than three parameters used, they are determined while changing one at a time.

(2) In the base technology, a parameter is determined in such a manner that a point at which the evaluation equation $C_f^{(m,s)}$ constituting the combined evaluation equation takes the minima is detected after the mapping such that the value of the combined evaluation equation becomes minimum is determined. However, instead of this two-step processing, a parameter may be effectively determined, as the case may be, in a manner such that the minimum value of a combined evaluation equation becomes minimum. In that case, $\alpha E_0+\beta E_1$, for instance, may be taken up as the combined evaluation equation, where $\alpha+\beta=1$ is imposed as a constraint so as to equally treat each evaluation equation. The essence of automatic determination of a parameter boils down to determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes ¼. However, it is possible to suppose that one block consists of 3×3 pixels and critical points are searched in this 3×3 block, then the number of pixels will be ⅑ as the level advances by one.

(5) When the source and the destination images are color images, they are first converted to monochrome images, and the mappings are then computed. The source color images are then transformed by using the mappings thus obtained as a result thereof. As one of other methods, the submappings may be computed regarding each RGB component.

Image Data Coding/Decoding Techniques

The novel and advantageous image data coding and decoding technology according to present embodiments utilizing, in part, the above-described base technology will be described.

Figure 18:
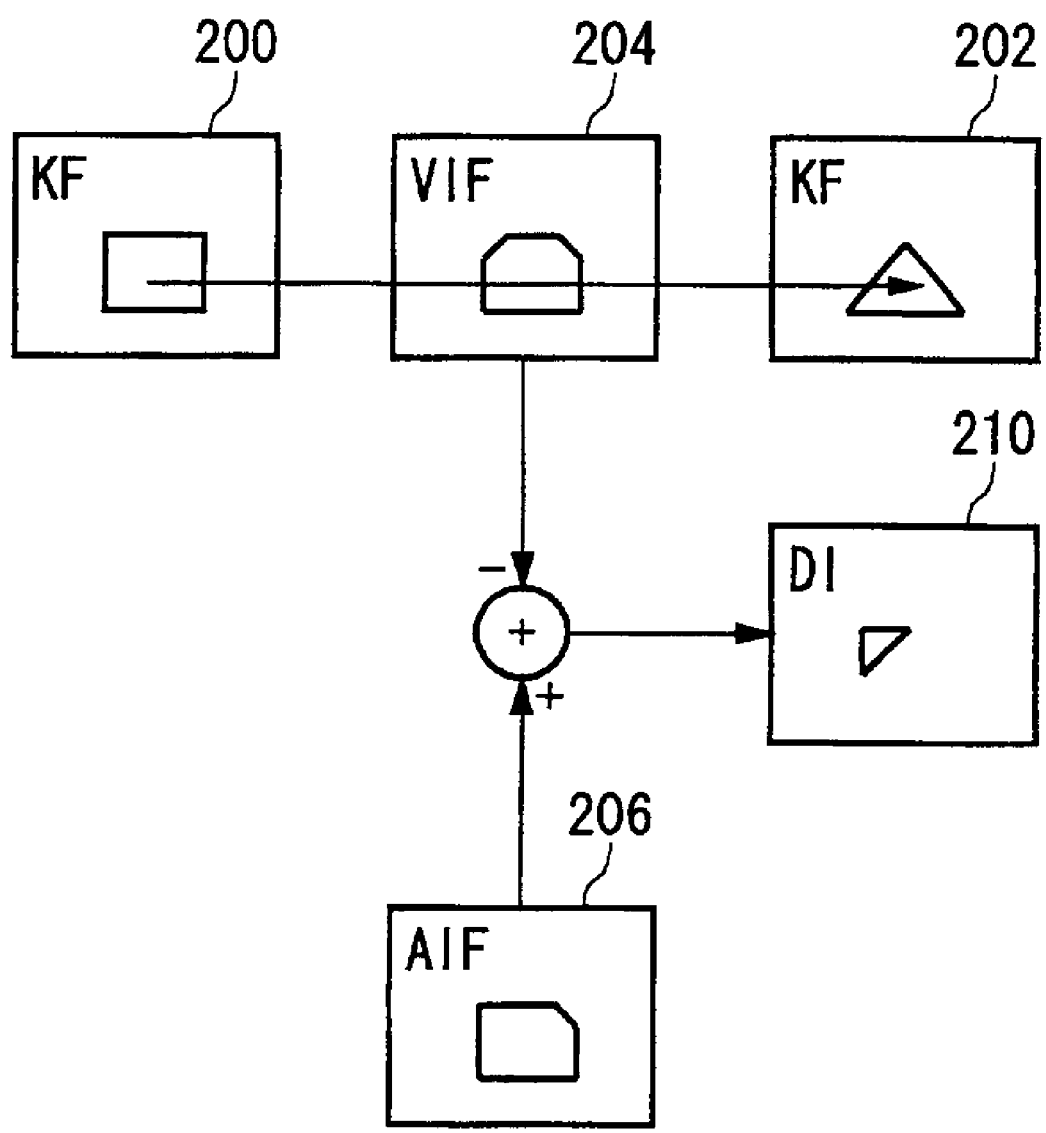
FIG. 18 is a conceptual diagram for image data coding according to an embodiment of the present invention.

FIG. 18 is a conceptual diagram for image data coding according to an embodiment of the present invention. Here, it is assumed that the image data comprise a key frame and an intermediate frame. The key frame may be determined from the outset, or may be so determined when encoded. In the latter case, first image data may be a usual moving picture or a medical image formed simply by a plurality of frames.

The process for determining the key frame is omitted. Suppose that two key frames (KF) 200 and 202 are given. The process is performed in a manner such that the matching between these key frames are computed so as to generate a virtual intermediate frame (VIF) 204. Such processes are described in detail in the base technology. However, in the base technology, the two key frames to which the matching is computed are expressed as the source image and the destination image. In other words, the virtual intermediate frame VIF is not an intermediate frame actually included in the initial image data sets (i.e. the actual intermediate frame) but a frame obtained from the key frames based on the matching computation.

Next, an actual intermediate frame (AIF) 206 is encoded using the virtual intermediate frame VIF 204. If the actual intermediate frame AIF 206 is located at a point which interior-divides the two key frames KF 200 and 202 by the ratio t:(1-t), then the virtual intermediate frame VIF 204 is similarly interpolated on the same assumption that VIF 204 is located at the point which interior-divides the key frames 200 and 202 by the ratio t:(1-t). This is interpolated by the trilinear method (see [1.8] in the base technology) using a quadrilateral or the like whose vertices are the corresponding points (namely, interpolated in the two directions x and y). Moreover, a technique other than the trilinear may be used here. For example, the interpolation may be performed on simply between the corresponding points without considering the quadrilateral.

The coding of the actual intermediate frame AIF 206 is realized such that a difference image DI 210 between the AIF 206 and the virtual intermediate frame VIF 204 is processed by the entropy coding (such as the Huffman coding and arithmetic coding), a JPEG coding using the DCT (Discrete Cosine Transform), dictionary based compression or the run-length coding, etc. Final encoded data of the image data (hereafter also referred to simply as encoded image data) are acquired as a combination of the encoded data of the difference image relating to this intermediate frame (hereafter simply referred to as encoded data of the intermediate frame) and the key frame data.

In the above method, the same virtual intermediate frames are obtained from the key frames by providing the same matching mechanism in both a coding side and an encoding side. Thus, when encoded data of the intermediate frame are acquired in addition to the key frame data, original data can be restored in the encoding side too. The difference image also can be effectively compressed by using the Huffman coding or other coding methods. The intermediate frame and key frame themselves may be compressed by either the lossless or lossy method, and may be structured such that such the compression method can be designated thereto.

Figure 19:
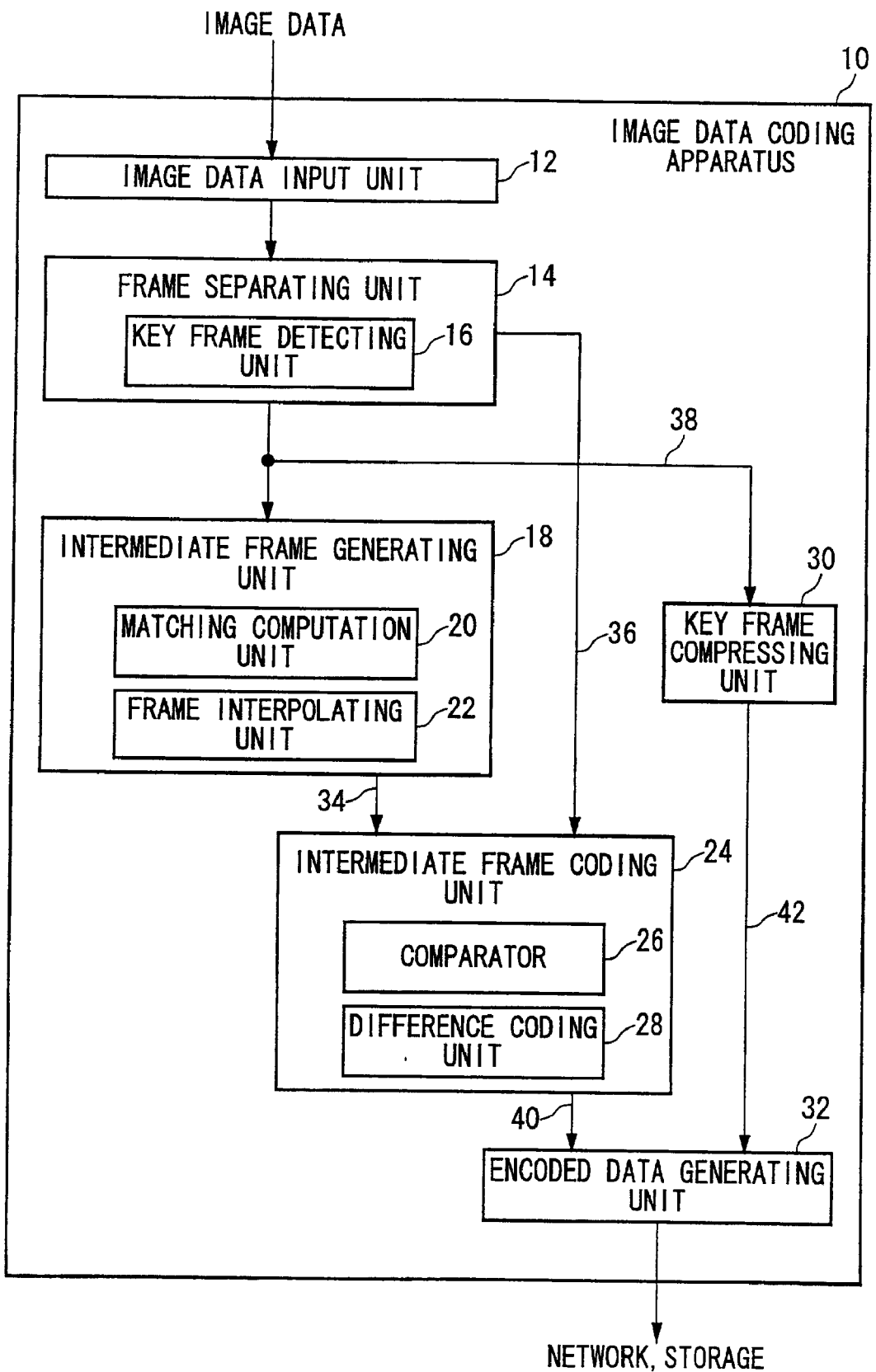
FIG. 19 is a block diagram showing a structure of an image data coding apparatus.
Figure 20:
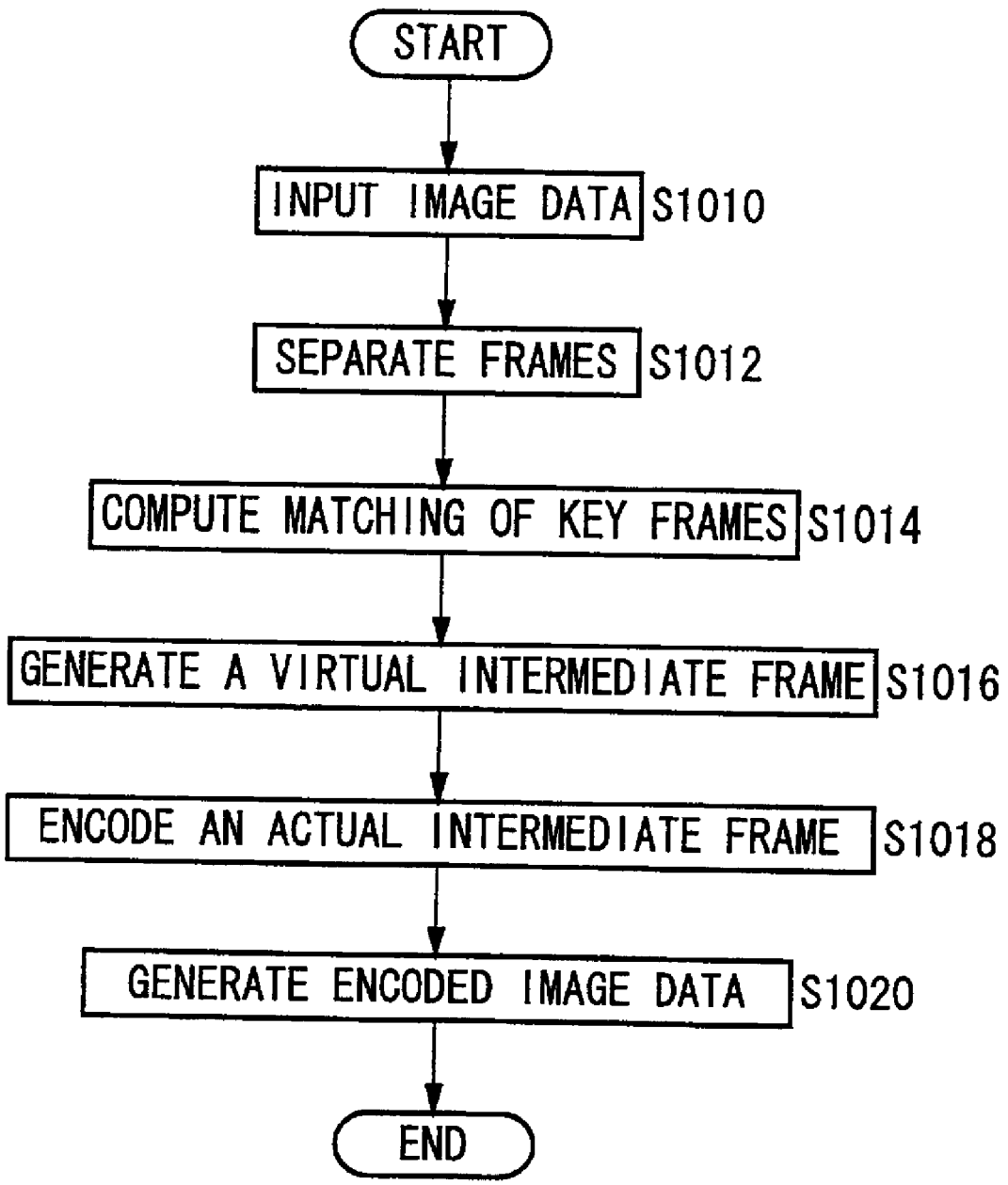
FIG. 20 is a flowchart showing a process carried out by the image data coding apparatus.

FIG. 19 is a block diagram showing a structure of an image data coding apparatus 10 which realizes the above-described coding processes. Each functional unit can be realized by, for example, a program loaded from a recording medium such as CD-ROM in a personal computer (PC). The same thing applies to a decoding apparatus described alter. FIG. 20 is a flowchart showing a process carried out by the image data coding apparatus 10.

An image data input unit 12 inputs image data to be coded, from a network, storage or the like (S1010). An optical equipment having communication capability, storage controlling capability or which photographs an image may serve as the image data input unit 12.

A frame separating unit 14 separates key frames included in the image data, into a key frame and an intermediate frame (S1012). A key frame detecting unit 16 detects as the key frame among a plurality of frames, one whose image difference from the immediately prior frame is relatively large. Using this selection procedure, the differences among key frames does not become unwieldily large and coding efficiency improves. It is to be noted that the key frame detecting unit 16 may select a frame at constant intervals so as to select it as the key frame. In this case, the procedure becomes very simple. The separated key frames 38 are sent to an intermediate frame generating unit 18 and a key frame compressing unit 30. Frames other than the key frames, that are actual intermediate frames 36, are sent to an intermediate frame coding unit 24.

The key frame compressing unit 30 compresses the key frames, and outputs the compressed key frame to an encoded data generating unit 32. A matching computation unit 20 in the intermediate frame generating unit 18 computes the matching between the key frames by utilizing the base technology or other available technique (S1014), and a frame interpolating unit 22 in the intermediate frame generating unit 12 generates a virtual intermediate frame based on the computed matching (S1016). The virtual intermediate frame 34 generated is supplied to the intermediate frame coding unit 24.

A comparator 26 in the intermediate frame coding unit 24 takes a difference between the virtual intermediate frame 34 and the actual intermediate frame 36, and then a difference coding unit 28 encodes this difference so as to produce encoded data 40 of the intermediate frame (S1018). The encoded data 40 of the intermediate frame are sent to the encoded data generating unit 32. The encoded data generating unit 32 generates and outputs final encoded image data by combining the encoded data 40 of the intermediate frame and the compressed key frames 42 (S1020).

Figure 21:
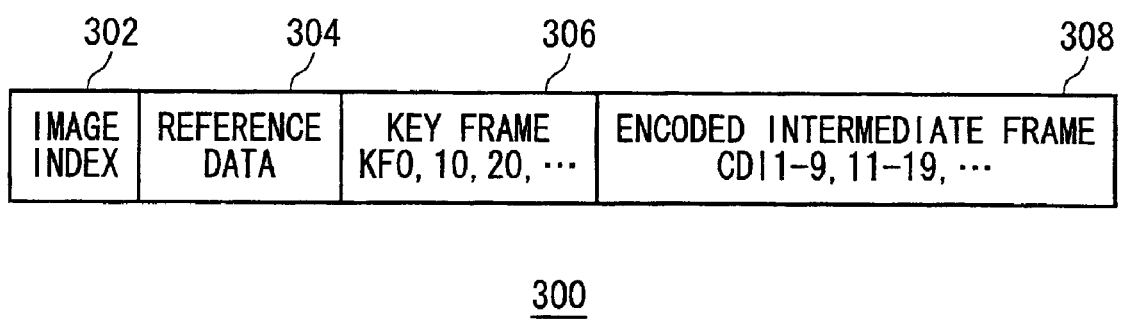
FIG. 21 shows an example of encoded image data 300.

FIG. 21 shows an example of encoded image data 300. The encoded image data 300 includes (1) an image index region 302 which stores an index such as a title of the image data and an ID for identifying the image data, (2) a reference data region 304 which stores data used in a decoding process, (3) a key frame data storing region 306 and (4) an encoded data sorting region 308 for the intermediate frames, and are structured in a manner integrating all (1) to (4). There are various parameters such as a coding method and a compression rate or the like. In FIG. 21 there are shown KF 0, KF 10, KF 20, . . . as examples of the key frames, and CDI's (Coded Difference Images) 1–9 and 11–19 related to frames other than the key frames as examples of the encoded data of the intermediate frames. The above shows the process performed at the coding side.

Figure 22:
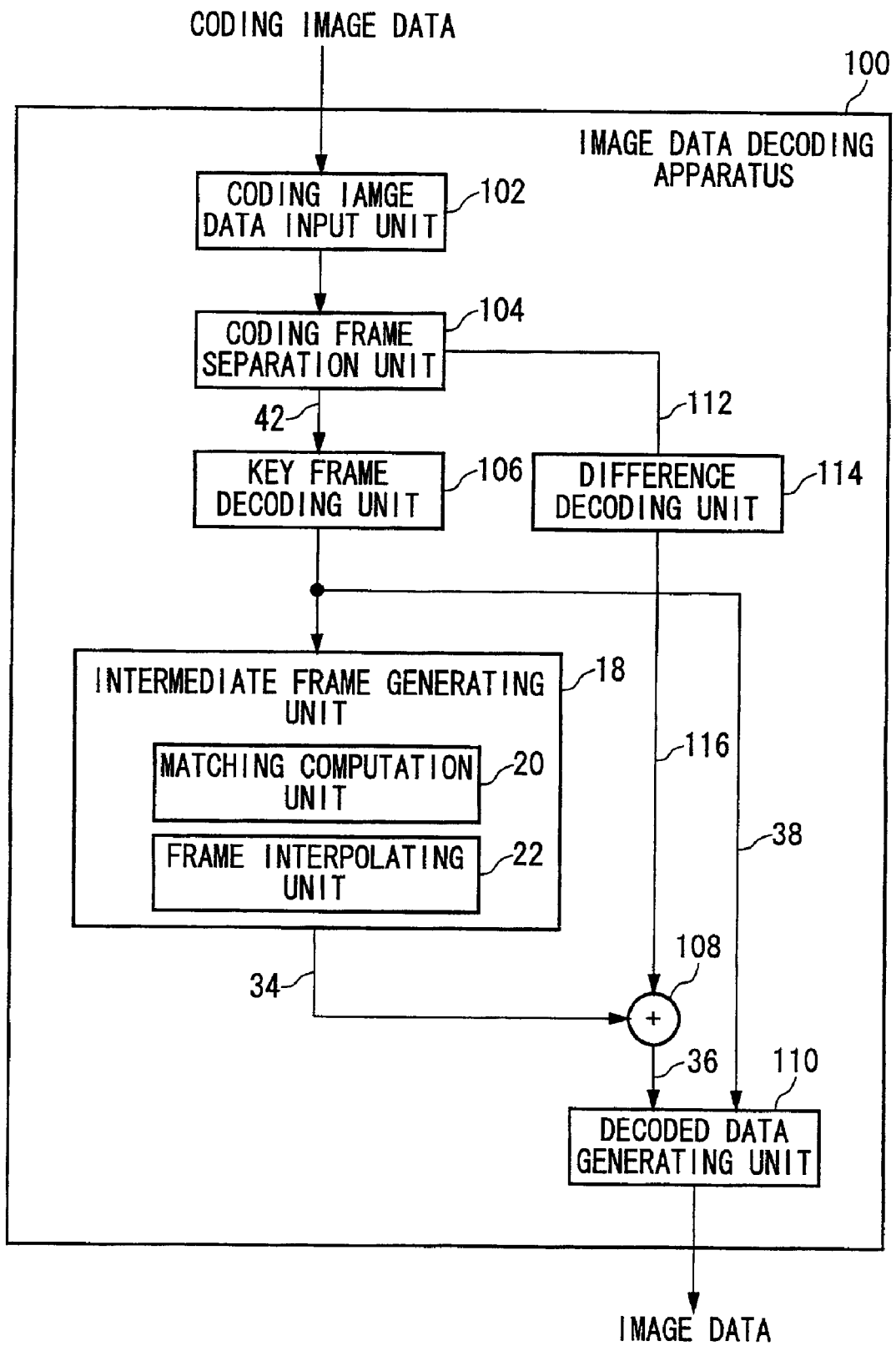
FIG. 22 is a block diagram showing a structure of an image data decoding apparatus.
Figure 23:
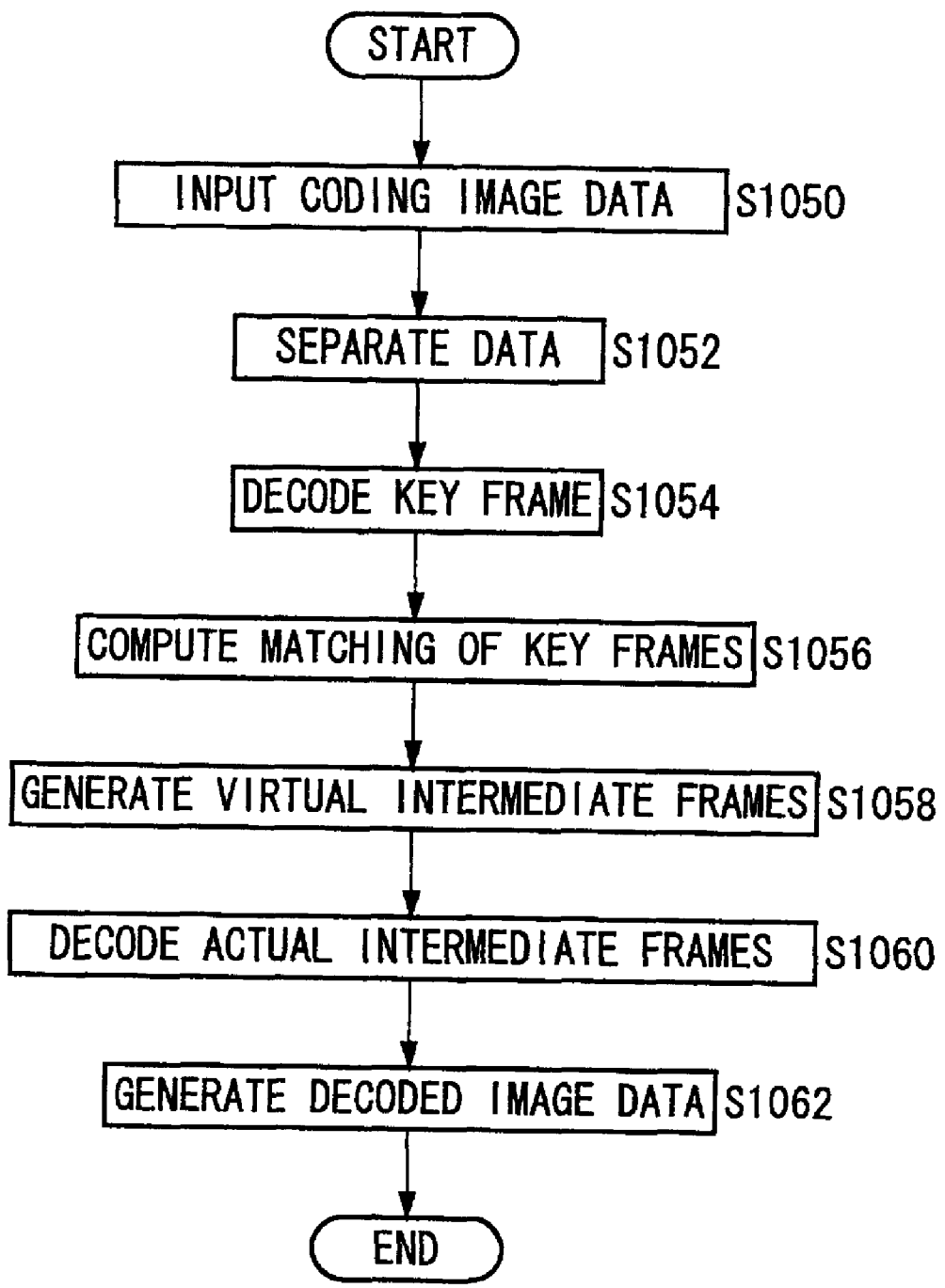
FIG. 23 is a flowchart showing a process carried out by the image data decoding apparatus.

On the other hand, FIG. 22 is a block diagram showing a structure of an image data decoding apparatus 100. FIG. 23 is a flowchart showing a process carried out by the image data decoding apparatus 100. The image data decoding apparatus 100 decodes the encoded image data obtained by the image data coding apparatus 10 to obtain the original image data.

An encoded image data input unit 102 acquires encoded image data from the network, storage, etc. (S1050). An encoded frame separating unit 104 separates a compressed key frame 42 included in the encoded image data, from other supplementary data 112 (S1052). The supplementary data 112 include the encoded data of the intermediate frames. The compressed key frame 42 is sent to a key frame decoding unit 106 and is decoded there (S1054). On the other hand, the supplementary data 112 are sent to a difference decoding unit 114 which then outputs a decoded difference image to an adder 108.

A key frame outputted from the key frame decoding unit 106 is sent to a decoded data generating unit 110 and an intermediate frame generating unit 18. The intermediate frame generating unit 18 generates a virtual intermediate frame 34 (S1058) via the same matching process as in the coding process (S1056). The virtual intermediate frame 34 is sent to the adder 108, so that the intermediate frame 34 is summed up with the decoded difference image 116. As a result of the summation, an actual intermediate frame 36 is decoded (S1060) and is then sent to the decoded data generating unit 110. The decoded data generating unit 110 decodes image data by combining the actual intermediate data 36 and the key frame 38 (S1062).

By implementing the above image coding and decoding schemes according to the embodiments, the virtual intermediate frames are produced using the per-pixel matching, so that a relatively high compression rate is achieved while maintaining the image quality. In the actual initial experiment, a higher compression rate was achieved compared to a case where all frames are uniformly compressed by JPEG.

Modifications

As a modified example for the embodiment, an idea concerning the error control may be introduced. Namely, it is the control that suppresses the error between the encoded image data and the original image data, within a certain range. The sum of squares of intensity values of the corresponding pixels in two images in terms of their positions serve as an evaluation equation for the error. Based on this error, the coding method and compression rate of the intermediate frame and key frame can be adjusted, or the key frame can be selected anew. For example, when the error relating to a certain intermediate frame exceeds an allowable value, a key frame can be provided anew in the vicinity of the intermediate frame or the interval between two key frames interposing the intermediate frame can be made smaller.

As another modified example, the image data coding apparatus 10 and the image data decoding apparatus 100 may be structured integrally. Then, the integrated structure may be realized with the intermediate frame generating unit 18 as a central shared unit. The integrated image coding-decoding apparatus encodes the image to be stored in the storage, and decodes it if necessary to be displayed or so.

As still another modified example, the image data coding apparatus 10 may be structured such that a process thereof starts from the input of the virtual intermediate frame generated outside the apparatus 10. In this case, the image data coding apparatus 10 shown in FIG. 19 consists of the intermediate frame coding unit 24, encoded data generating unit 32 and/or the key frame compressing unit 30 (if necessary). The still another modified example may further include other cases depending on how other unit/units is/are provided outside the apparatus 10 to a relatively high degree of freedom understood to those skilled in the art.

Similarly, the image data decoding apparatus 100 may be structured such that a process thereof starts from the inputs of the key frame, virtual intermediate frame and encoded data of the intermediate frame generated outside the apparatus 100. In this case, the image data decoding apparatus 100 shown in FIG. 22 consists of the difference decoding unit 114, adder 108 and decoded data generating unit 110. The high degree of freedom in designing the structure of the image data decoding apparatus 10 exists as in the image data coding apparatus 10.

The above-described embodiments are described with much emphasis on the per-pixel matching. However, the image data coding techniques according to the present embodiments are not limited thereto, and include the processes of obtaining the virtual intermediate frames through the process performed between the key frames as well as a technique as a whole including these processes as a preprocessing. A block matching may be computed between key frames. Moreover, arbitrary linear or non-linear process may be carried out for generating the virtual intermediate frame. The same things may be applied at the decoding side. It is to be noted that one of key points in implementing the present invention lies in that the virtual intermediate frame obtained in the same method is presupposed at both the coding side and encoding sides as a general rule. However, this is not absolutely necessary, and the decoding side may function following a rule adopted in the coding process, or the coding side may function following a rule adopted in the decoding process.

Although the present invention has been described by way of exemplary embodiments, it should be understood that many changes and substitutions may be made by those skilled in the art without departing from the spirit and the scope of the present invention which is defined by the appended claims.

What is claimed is:

1. A method of coding image data, comprising:
   acquiring a plurality of image frames included in image data;
   detecting one or more key frames among the plurality of image frames by determining image frames having an image difference from an immediately prior frame that exceeds a predetermined threshold;
   separating the image frames into key frames and intermediate frames;
   computing a matching between the key frames thus separated;
   generating a virtual intermediate frame based on the matching; and
   encoding an actual intermediate frame included in the image data based on the virtual intermediate frame.

2. A method as recited in claim 1, wherein said computing comprises computing the matching, in a per-pixel manner, between the key frames, and said generating comprises performing an interpolation computation per pixel based on correspondence of a pixel position and intensity between the key frames so as to generate the virtual intermediate frame.

3. A method as recited in claim 1, wherein said encoding comprises encoding a difference of the virtual intermediate frame and the actual intermediate frame.

4. A method as recited in claim 1, further comprises outputting, as encoded data for the image data, a combination of key frame data and data obtained in said encoding process.

5. A recording medium which stores a program executable by a computer, the program comprising the functions of:
   acquiring a plurality of image frames included in image data;
   detecting one or more key frames among the plurality of image frames by determining image frames having an image difference from an immediately prior frame that exceeds a predetermined threshold;
   separating the image frames into key frames and intermediate frames;
   computing a matching between the key frames thus separated;
   generating a virtual intermediate frame based on the matching; and
   encoding an actual intermediate frame included in the image data based on the virtual intermediate frame.

6. An image data coding apparatus, comprising:
   a unit which acquires image data including a plurality of frames;
   a unit which detects one or more key frames among the plurality of image frames by determining image frames having an image difference from an immediately prior frame that exceeds a predetermined threshold;
   a unit which separates the frames into key frames and intermediate frames;
   a unit which inputs the key frames thus separated and computes a matching between the inputted key frames;
   a unit which generates a virtual intermediate frame based on the matching computed; and
   a unit which encodes an actual intermediate frame thus separated, based on the virtual intermediate frame.

7. An image data coding apparatus as recited in claim 6, wherein said key frame detecting unit selects an image frame at constant intervals.

8. An image data coding apparatus as recited in claim 6, wherein said encoding unit encodes a difference between the virtual intermediate frame and the actual intermediate frame.

9. An image data coding apparatus as recited in claim 6, wherein said matching computing unit performs a per-pixel matching between the key frames.

10. An image data coding apparatus as recited in claim 9, wherein said generating unit interpolates in-between pixels of the key frames based on the per-pixel matching, so as to generate the virtual intermediate frame.

11. An image data coding apparatus as recited in claim 9, wherein said generating unit interpolates in-between blocks of the key frames based on the per-block matching, so as to generate the virtual intermediate frame, the block being composed of a plurality of pixels.

12. An image data coding apparatus as recited in claim 6, wherein said generating unit performs an interpolation calculation per pixel based on correspondence of position and intensity of a pixel between the key frames, so as to generate the virtual intermediate frame.

13. An image data coding apparatus as recited in claim 6, wherein said generating unit performs an interpolation calculation per block based on correspondence of position and intensity of a block between the key frames, so as to generate the virtual intermediate frame, the block being composed of a plurality of pixels.

14. An image data coding apparatus as recited in claim 6, further comprising a unit which combines data of the key frame and outputted data of said encoding unit, and which outputs the combined data as encoded data for the image data.

15. An image data coding apparatus as recited in claim 6, further comprising a unit which selects an image frame as a key frame in the vicinity of a particular intermediate frame or an interval between two key frames when an error relating to the particular intermediate frame exceeds an allowable value, the error being determined as between encoded image data and original image data.

16. A method of decoding image data, comprising:
acquiring encoded image data that has been encoded according to the method of claim 1 and comprising key frames and supplementary data;
separating key frames from supplementary data;
generating a virtual intermediate frame based on computing a matching between the key frames thus separated; and
decoding an actual intermediate frame based on the virtual intermediate frame and the supplementary data.

17. A method as recited in claim 16, wherein the supplementary data comprise data generated based on a difference between the actual intermediate frame and the virtual intermediate frame.

18. A method as recited in claim 17, wherein said decoding process is such that the actual intermediate frame is decoded by adding decoded data of data generated based on the virtual intermediate frame and the difference.

19. A method as recited in claim 16, further comprising outputting as decoded data of the image data a combination of data of the key frame and data of the actual intermediate frame.

20. A recording medium which stores a program executable by a computer, the program comprising the functions of:
acquiring encoded image data that has been encoded according to the method of claim 1 and comprising key frames and supplementary data;
separating key frames from supplementary data;
generating a virtual intermediate frame based on computing a matching between the key frames thus separated; and
decoding an actual intermediate frame based on the virtual intermediate frame and the supplementary data.

21. An image data decoding apparatus, comprising:
a unit which acquires encoded image data that has been encoded according to the method of claim 1 and comprising key frames and supplementary data;
a unit which separates key frames from supplementary data;
a unit which computes a matching between the key frames separated in said separating unit;
a unit which generates a virtual intermediate frame based on the matching computed in said computing unit; and
a unit which decodes an actual intermediate frame based on the virtual intermediate frame and the supplementary data.

22. An image data decoding apparatus as recited in claim 21, wherein the supplementary data comprise data generated based on a difference between the actual intermediate frame and the virtual intermediate frame.

23. An image data decoding apparatus as recited in claim 22, wherein said decoding unit decodes the actual intermediate frame by adding the virtual intermediate frame to the data generated based on the difference.

24. An image data decoding apparatus as recited in claim 21, further comprising a unit which outputs as decoded data of the image data a combination of data of the key frame and data of the actual intermediate frame.

25. A method of coding image data, comprising:
acquiring a plurality of image frames included in image data;
detecting one or more key frames among the plurality of image frames by determining image frames having an image difference from an immediately prior frame that exceeds a predetermined threshold;
separating the image frames into key frames and intermediate frames;
processing the key frames by:
generating a series of source hierarchical images of different resolutions by operating a multiresolutional critical point filter on a first key frame obtained by said separating process;
generating a series of destination hierarchical images of different resolutions by operating the multiresolutional critical point filter on an adjacent second key frame obtained by said separating process;
computing a matching of the source hierarchical images and the destination hierarchical images among a resolutional level hierarchy;
generating a virtual intermediate frame based on the matching computed; and
encoding an actual intermediate frame included in the image data, based on the virtual intermediate frame.

26. An image data coding apparatus, comprising:
a unit which acquires image data including a plurality of frames;
a unit which detects one or more key frames among the plurality of image frames by determining image frames having an image difference from an immediately prior frame that exceeds a predetermined threshold;
a unit which separates the frames into key frames and intermediate frames;
a unit which inputs the key frames thus separated and computes a matching between the inputted key frames;
a unit which generates a virtual intermediate frame based on the matching computed; and
a unit which encodes an actual intermediate frame thus separated, based on the virtual intermediate frame,
wherein said matching computing unit generates a series of source hierarchical images of different resolutions by operating a multiresolutional critical point filter on a first key frame obtained by said separating unit, generates a series of destination hierarchical images of different resolutions by operating the multiresolutional critical point filter on a second key frame obtained from by said separating unit, and computes a matching of the source hierarchical images and the destination hierarchical images among a resolution level hierarchy.

* * * * *